United States Patent
Lee et al.

(10) Patent No.: US 12,038,285 B1
(45) Date of Patent: Jul. 16, 2024

(54) HYBRID INERTIAL NAVIGATION SYSTEM AND METHOD

(71) Applicant: National Technology & Engineering Solutions of Sandia, LLC, Albuquerque, NM (US)

(72) Inventors: Jongmin Lee, Albuquerque, NM (US); Daniel Beom Soo Soh, Pleasanton, CA (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 434 days.

(21) Appl. No.: 17/396,902

(22) Filed: Aug. 9, 2021

Related U.S. Application Data

(60) Provisional application No. 63/072,330, filed on Aug. 31, 2020.

(51) Int. Cl.
*G01C 21/18* (2006.01)
*G01C 21/16* (2006.01)

(52) U.S. Cl.
CPC ......... *G01C 21/18* (2013.01); *G01C 21/1656* (2020.08)

(58) Field of Classification Search
CPC .............................. G01C 21/18; G01C 21/1656
See application file for complete search history.

(56) References Cited

U.S. PATENT DOCUMENTS

| | | | | |
|---|---|---|---|---|
| 2010/0149541 | A1* | 6/2010 | Aarons | G01C 19/58 356/450 |
| 2013/0213135 | A1* | 8/2013 | Compton | H05H 3/02 73/514.01 |
| 2014/0016118 | A1* | 1/2014 | Compton | G01C 19/58 356/72 |
| 2014/0022534 | A1* | 1/2014 | Strabley | G01P 15/093 356/72 |
| 2016/0298967 | A1* | 10/2016 | Johnson | G01C 19/58 |

(Continued)

OTHER PUBLICATIONS

Altin, P.A. et al., "Precision Atomic Gravimeter Based on Bragg Diffraction," New Journal of Physics (2013) 15:023009, 20 pages.

(Continued)

*Primary Examiner* — Helen C Kwok
(74) *Attorney, Agent, or Firm* — Mark A. Dodd

(57) ABSTRACT

A hybrid inertial navigation system and method are provided. The system includes a conventional inertial measurement unit (with a three-axis accelerometer and a three-axis gyroscope operating at a high data rate and low sensitivity), light pulse atom interferometer accelerometer and gyroscope (operating at a low data rate and high sensitivity), and a processing system. The method of the hybrid inertial navigation system includes precisely determining an acceleration and an angular velocity and allowing light pulse atom interferometry operation under dynamic environments. A processing system of the hybrid inertial navigation system performs feedforward correction operations on the light-pulse atom interferometer accelerometer and gyroscope of the hybrid inertial navigation system. The processing system determines one or more control signals based on the inertial information from the conventional inertial measurement unit, a light pulse atom interferometer model, and the feedforward algorithm.

18 Claims, 22 Drawing Sheets

(56) References Cited

U.S. PATENT DOCUMENTS

| | | | | |
|---|---|---|---|---|
| 2017/0299389 | A1* | 10/2017 | Johnson | G01P 15/08 |
| 2019/0376790 | A1* | 12/2019 | Barrett | G01P 15/08 |
| 2022/0163331 | A1* | 5/2022 | Kasevich | G01V 7/04 |

OTHER PUBLICATIONS

Avinadav, C. et al., "Rotation Sensing With Improved Stability Using Point-Source Atom Interferometry," Physical Review A (2020) 102:013326, 8 pages.

Biedermann, G.W. et al., "Atom Interferometry in a Warm Vapor," Physical Review Letters (2017) PRL 118:163601, 5 pages.

Biedermann, G.W. et al., "Testing Gravity With Cold-Atom Interferomerts," Physical Review A (2015) 91:033629, 10 pages.

Brzozowski, T. et al., "Time-of-Flight Measurement of the Temperature of Cold Atoms for Short Trap-Probe Beam Distances," Jornal of Optics B: Quantum and Semiclassical Optics (2002) 4:62-66.

Durfee, D.S. et al., "Long-Term Stability of an Area-Reversible Atom-Interferometer Sagnac Gyroscope," Physical Review Letters (2006) PRL 97:240801, 4 pages.

El-Sheimy, N. et al., "Inertial Sensors Technologies for Navigation Applications: State of the Art and Future Trends," Satellite Navigation (2020) 1(2):1-21.

Fixler, J.B. et al., "Atom Interferometer Measurement of the Newtonian Constant of Gravity," Science (2007) 315:74-77.

Goban, A. et al., "Demonstration of a State-Insensitive, Compensated Nanofiber Trap," Physical Review Letters * (2012) PRL 109:033603, 5 pages.

Hoffman, J.E. et al., "Ultrahigh Transmission Optical Nanofibers," AIP Advances (2014) 4:067124-1-067124-16.

Hoffman, J. E. et al., "Pulling Algorithm and Simulation," 2014, https://drum.lib.umd.edu/handle/1903/15069.

Jau, Y.-Y. et al., "Microfabricated Waveguide Atom Traps," Sandia Report, Unlimited Release, Sandia National Laboratories, Albuquerque, NM, Sep. 2017, 39 pages.

Kasevich, M. et al., "Measurement of the Gravitational Acceleration of an Atom With a Light-Pulse Atom Interferometer," Applied Physics B (1992) 54:321-332.

Keil, M. et al., "Fifteen Years of Cold Matter on the Atom Chip: Promise, Realizations, and Prospects," Journal of Modern Optics (2016) 63(18):1840-1885.

Kien, F. L. et al., "Atom Trap and Waveguide Using a Two-Color Evanescent Light Field Around a Subwavelength-Diameter Optical Fiber," Physical Review A (2004) 70:063403, 9 pages.

Lee, J. et al., "Inhomogeneous Broadening of Optical Transitions of 87Rb Atoms in an Optical Nanofiber Trap," Journal of Physics B: Atomic, Molecular and Optical Physics (2015) 48:165004, 6 pages.

Lee, J. et al., "Integrated Optical Dipole Trap for Cold Neutral Atoms With an Optical Waveguide Coupler," New Journal of Physics (2013) 15:043010, 14 pages.

McDonald, G.D. et al., "Optically Guided Linear Mach-Zehnder Atom Interferometer," Physical Review A (2013) 87:013632, 5 pages.

McGuinness, H. J. et al., "High Data-Rate Atom Interferometer for Measuring Accelation," Applied Physics Letter (2012) 100:011106-1-011106-4.

Meng, Y. et al., "A nanowaveguide Platform for Collective Atom-Light Interaction," Applied Physics Letters (2015) 107:091110-1-091110-5.

Miller, J.D. et al., "Far-Off-Resonance Optical Trapping of Atoms," Physical Review A (1993) 47(6):47, 4 pages.

Muller, H. et al., "Atom Interferometry With Up to 24-Photon-Momentum-Transfer Beam Splitters," Physical Review Letters (2008) PRL 100:180405, 4 pages.

Nourshargh, R., "A Laboratory Atom Interferometer Instrucment," Ultracold Atoms Group, School of Physics and Astronomy College of Engineering and Physical Sciences the University of Birmingham, Aug. 2018, 60 pages.

Parazzoli, L.P. et al., "Observation of Free-Space Single-Atom Matter Wave Interference," Physical Review Letters (2012) PRL 109:230401, 5 pages.

Press, W. H. et al., "Numerical Recipes in C." The Art of Scientific, Computing Second Edition (2002) Cambridge University Press, 1018 pages.

Rakholia, A. V. et al., "Dual-Axis, High Data-Rate Atom Interferometer Via Cold Ensemble Exchange," Physical Review Applied (2014) 2:054012, 8 pages.

Rakholia, A. V. et al., "Dual-Axis, High Data-Rate Atom Interferometer Via Cold Ensemble Exchange," Jul. 14, 2014, 8 pages.

Sorrentino, F., "Atom Interferometry Gyroscopes," Universita di Firenze & INFN, Dec. 19, 2011, 33 pages.

Steane, A.M. et al., "Laser Colling Below the Doppler Limit in a Magneto-Optical Trap," Europhysics Letters (1991) 14(3):231-236.

Trimeche, A. et al., "Active Control of Laser Wavefronts in Atom Interferometers," Apr. 24, 2017, 8 pages.

Vetsch, E., "Optical Interface Based on a Nanofiber Atom-Trap," Dissertation (2010) Johannes Gutenberg-Universitat, Mainz, 152 pages.

Vetsch, E. et al., "Optical Interface Created by Laser-Cooled Atoms Trapped in the Evanescent Field Surrounding an Optical Nanofiber," Physical Review Letters (2010) PRL 104:203603, 4 pages.

Ward, J.M. et al., "Contributed Review: Optical Micro-and nanofiber Pulling Rig," Review of Scientific Instruments (2014) 85:111501-1-111501-10.

West, A. D., "Systematic Effects in Two-Dimensional Trapped Matter-Wave Interferometers," Physical Review A (2019) 100:063622, 8 pages.

Xin, Mingjie et al., "An Atom Interferometer Inside a Hollow-Core Photonic Crystal Fiber," Science Advances (2018) 4:e1701723, 6 pages.

Yang, H. et al., "Performance Comparison of Wavefront-Sensorless Adaptive Optics Systems by Using of the Focal Plane," International Journal of Optics (2015) 2015, Article ID 985351, 8 pages.

Zhou, M.K. et al., "Observing the Effect of Wave-Front Aberrations in an Atom Interferometer by Modulating the Diameter of Raman Beams," Physical Review A (2016) 93:043610, 6 pages.

* cited by examiner

HYBRID INERTIAL NAVIGATION SYSTEM AND METHOD

RELATED APPLICATIONS

This application claims priority to U.S. Provisional Application No. 63/072,330, filed on Aug. 31, 2020, and entitled HYBRID INERTIAL NAVIGATION SYSTEM AND METHOD, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present disclosure relates generally to an inertial navigation system, and, in particular embodiments, to a hybrid inertial navigation system comprising conventional and matterwave inertial measurement units and a method of operating the same.

BACKGROUND

High-precision positioning, navigation, and timing (PNT) sensors are attractive for advanced positional awareness in high dynamic conditions. Atomic sensors have accomplished the state-of-the-art records of sensitivities and accuracies in gravimeters, gravity gradiometers, accelerometers, gyroscopes, clocks, magnetometers, and electrometers that are comparable to the best classical sensors. The development of compact, deployable light-pulse atom interferometer (LPAI) accelerometers (ACCs) and gyroscopes (GYROs) for inertial navigation while maintaining laboratory-level performance is a significant goal in the industry. LPAI sensor platforms having a compact size, low weight, low power, and immunity to high dynamic environments and vibration conditions are of particular interest. Performance of the LPAI-ACCs and LPAI-GYROs is limited by Doppler shift and LPAI sensor platform motion.

SUMMARY

In accordance with some embodiments, a hybrid inertial navigation system (INS) includes a conventional inertial measurement unit (IMU) consisting of a three-axis accelerometer (IMU-ACC) and a three-axis gyroscope (IMU-GYRO), a light-pulse atom interferometer accelerometer (LPAI-ACC), a light-pulse atom interferometer gyroscope (LPAI-GYRO), and a processing system (PS) coupled to the conventional IMU, the LPAI-ACC, and the LPAI-GYRO. The IMU-ACCs and IMU-GYROs operate at a high data rate, for example, 500 Hz to 1.5 kHz, and low sensitivity, for example, navigation-grade performance. In contrast, the LPAI-ACCs and LPAI-GYROs operate at a low data rate, for example, 20 Hz to 500 Hz, and high sensitivity, for example, strategic-grade performance. The hybrid INS can precisely determine an acceleration and an angular velocity and to allow LPAI operation under dynamic environments. The processing system determines one or more control signals based on the inertial information from the IMU-ACCs and IMU-GYROs, the LPAI physics model, and a feedforward algorithm. The PS and the conventional IMU are configured to perform one or more feedforward correction operations (FF-COs) on the LPAI-ACC, i.e., LPAI-ACC FF-COs, and/or one or more FF-COs on the LPAI-GYRO, i.e., LPAI-GYRO FF-COs. In accordance with other embodiments, methods corresponding to various combinations of these LPAI-ACC FF-COs and LPAI-GYRO FF-COs are implemented.

For convenience, the sensing axes of the LPAI-ACC and the LPAI-GYRO are defined as being parallel to the axes of the light pulses, i.e., Doppler-sensitive Raman pulses, in the LPAI-ACC and the LPAI-GYRO, respectively. For convenience, the off-axes or cross-axes of the LPAI-ACC and the LPAI-GYRO are defined as being perpendicular to the axes of the light pulses, i.e., Doppler-sensitive Raman pulses, in the LPAI-ACC and the LPAI-GYRO, respectively. In various embodiments, the light pulse sequence of LPAI-ACCs and LPAI-GYROs corresponds to $\pi/2 \to T \to \pi \to T \to \pi/2$, where $\pi/2$ and $\pi$ are Raman pulses, and T is an interrogation time between two Raman pulses.

In an embodiment, the LPAI-ACC on-axis acceleration FF-COs with beam detuning include: determining, by the IMU-ACCs, an acceleration along a first direction, wherein the first direction is parallel to the sensing axis of the LPAI-ACC; determining, by the PS, a corrected detuning, a corrected intensity, and a corrected pulse duration for at least one LPAI-ACC Raman pulse based on the acceleration; generating, by the PS, a first control signal based on the corrected detuning, the corrected intensity, and the corrected pulse duration; and setting, by the LPAI-ACC Raman laser system, a detuning, an intensity, and a pulse duration of the at least one LPAI-ACC Raman pulse to the corrected detuning, the corrected intensity, and the corrected pulse duration, respectively, based on the first control signal.

In an embodiment, the LPAI-ACC cross-axis acceleration FF-COs with beam intensity include: determining, by the IMU-ACCs, an acceleration along a second direction, wherein the second direction is perpendicular to the sensing axis of the LPAI-ACC; determining, by the PS, a corrected intensity and a corrected pulse duration for at least one LPAI-ACC Raman pulse based on the acceleration; generating, by the PS, a second control signal based on the corrected intensity and the corrected pulse duration; and setting, by the LPAI-ACC Raman laser system, an intensity and a pulse duration of the at least one LPAI-ACC Raman pulse to the corrected intensity and the corrected pulse duration, respectively, based on the second control signal.

In an embodiment, the LPAI-ACC cross-axis acceleration FF-COs with beam translation include: determining, by the IMU-ACCs, an acceleration along a third direction, wherein the third direction is perpendicular to the sensing axis of the LPAI-ACC; determining, by the PS, a shift direction and a shift distance for at least one LPAI-ACC Raman pulse based on the acceleration; generating, by the PS, a third control signal based on the shift direction and the shift distance; and translating the at least one LPAI-ACC Raman pulse in the shift direction by the shift distance based on the third control signal. In an embodiment, the shift direction is opposite to the third direction, and the shift distance is determined by the PS using kinematic equations.

In an embodiment, the LPAI-ACC cross-axis rotation FF-COs with beam rotation include: determining, by the IMU-GYROs, an angular velocity along a fourth direction, wherein the fourth direction is perpendicular to the sensing axis of the LPAI-ACC; determining, by the PS, a rotation axis, a rotation direction, and a rotation angle for at least one LPAI-ACC Raman pulse based on the angular velocity; generating, by the PS, a fourth control signal based on the rotation axis, the rotation direction, and the rotation angle; and rotating the at least one LPAI-ACC Raman pulse around the rotation axis by the rotation angle in the rotation direction based on the fourth control signal. In an embodiment, the rotation axis is along the fourth direction, the rotation direction is opposite to a rotation direction defined by the angular velocity, and the rotation angle is determined by the PS using kinematic equations.

In an embodiment, the LPAI-GYRO on-axis acceleration FF-COs with beam detuning include: determining, by the IMU-ACCs, an acceleration along a fifth direction, wherein the fifth direction is parallel to the sensing axis of the LPAI-GYRO; determining, by the PS, a corrected detuning, a corrected intensity, and a corrected pulse duration for at least one LPAI-GYRO Raman pulse based on the acceleration; generating, by the PS, a fifth control signal based on the corrected detuning, the corrected intensity, and the corrected pulse duration; and setting, by the LPAI-GYRO Raman laser system, a detuning, an intensity, and a pulse duration of the at least one LPAI-GYRO Raman pulse to the corrected detuning, the corrected intensity, and the corrected pulse duration, respectively, based on the fifth control signal.

In an embodiment, the LPAI-GYRO cross-axis acceleration FF-COs with beam intensity include: determining, by the IMU-ACCs, an acceleration along a sixth direction, wherein the sixth direction is perpendicular to the sensing axis of the LPAI-GYRO; determining, by the PS, a corrected intensity and a corrected pulse duration for at least one LPAI-GYRO Raman pulse based on the acceleration; generating, by the PS, a sixth control signal based on the corrected intensity and the corrected pulse duration; and setting, by the LPAI-GYRO Raman laser system, an intensity and a pulse duration of the at least one LPAI-GYRO Raman pulse to the corrected intensity and the corrected pulse duration, respectively, based on the sixth control signal.

In an embodiment, the LPAI-ACC cross-axis acceleration FF-COs with beam translations include: determining, by the IMU-ACCs, an acceleration along a seventh direction, wherein the seventh direction is perpendicular to the sensing axis of the LPAI-ACC; determining, by the PS, a shift direction and a shift distance for at least one LPAI-ACC Raman pulse based on the acceleration; generating, by the PS, a seventh control signal based on the shift direction and the shift distance; and translating the at least one LPAI-ACC Raman pulse in the shift direction by the shift distance based on the seventh control signal. In an embodiment, the shift direction is opposite to the seventh direction, and the shift distance is determined by the PS using kinematic equations.

In an embodiment, the LPAI-GYRO on-axis rotation FF-COs with beam rotation include: determining, by the IMU-GYROs, an angular velocity along an eighth direction, wherein the eighth direction is parallel to the sensing axis of the LPAI-GYRO; determining, by the PS, a rotation axis, a rotation direction, and a rotation angle for at least one LPAI-GYRO Raman pulse; generating, by the PS, an eighth control signal based on the rotation axis, the rotation direction, and the rotation angle; and rotating the at least one LPAI-GYRO Raman pulses around the rotation axis by the rotation angle in the rotation direction, based on the eighth control signal. In an embodiment, the rotation axis is along the eighth direction, the rotation direction is opposite to a rotation direction defined by the angular velocity, and the rotation angle is determined by the PS using kinematic equations.

In an embodiment, the LPAI-GYRO cross-axis rotation FF-COs with beam rotation include: determining, by the IMU-GYROs, an angular velocity along a ninth direction, wherein the ninth direction is perpendicular to the sensing axis of the LPAI-GYRO; determining, by the PS, a rotation axis, a rotation direction, and a rotation angle for at least one LPAI-GYRO Raman pulse; generating, by the PS, a ninth control signal based on the rotation axis, the rotation direction, and the rotation angle; and rotating the at least one LPAI-GYRO Raman pulse around the rotation axis by the rotation angle in the rotation direction, based on the ninth control signal. In an embodiment, the rotation axis is along the ninth direction, the rotation direction is opposite to a rotation direction defined by the angular velocity, and the rotation angle is determined by the PS using kinematic equations.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1A:
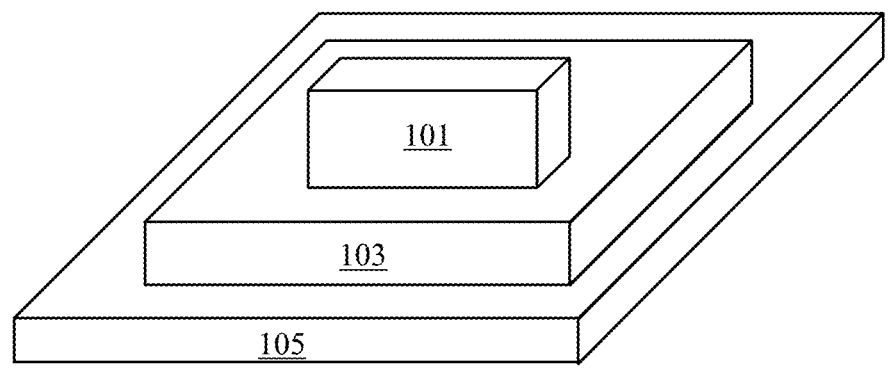
FIG. 1A illustrates a hybrid inertial navigation system attached to a vehicle in accordance with some embodiments.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure relates generally to an inertial navigation system (INS), and, in particular embodiments, to a hybrid INS comprising a conventional inertial measurement unit (IMU) (having a three-axis accelerometer, which may be implemented as three orthogonal single-axis accelerometers (IMU-ACCs) and a three-axis gyroscope, which may be implemented as three orthogonal single-axis gyroscopes (IMU-GYROs)) and a light-pulse atom interferometer (LPAI) inertial sensors (such as, for example, light-pulse atom interferometer (LPAI) accelerometers (LPAI-ACCs) and LPAI gyroscopes (LPAI-GYROs) and a method of operating the same. Various embodiments presented herein are described with respect to free-space LPAI inertial sensors (such as LPAI inertial sensors, where atoms are unrestricted and are free to move in all three dimensions) and guided LPAI inertial sensors (such as LPAI inertial sensors, where atoms are confined and are able to move, for example, only in one dimension). Various embodiments presented herein allow for overcoming limitations due to motion of a platform of a hybrid INS by employing a feedforward correction using a conventional IMU to correct for on-axis accelerations and on-axis rotations (such as accelerations and rotations along a sensing axis of an LPAI inertial sensor), and cross-axis accelerations and cross-axis rotations (such as accelerations and rotations perpendicular or transverse to a sensing axis of an LPAI inertial sensor). As a result of the feedforward correction, in some embodiments, parameters of an LPAI inertial sensor such as an intensity (or an amplitude), detuning, or pulse duration of at least one of the Raman pulses is dynamically adjusted. In other embodiments, Raman pulses are translated or rotated.

Figure 1B:
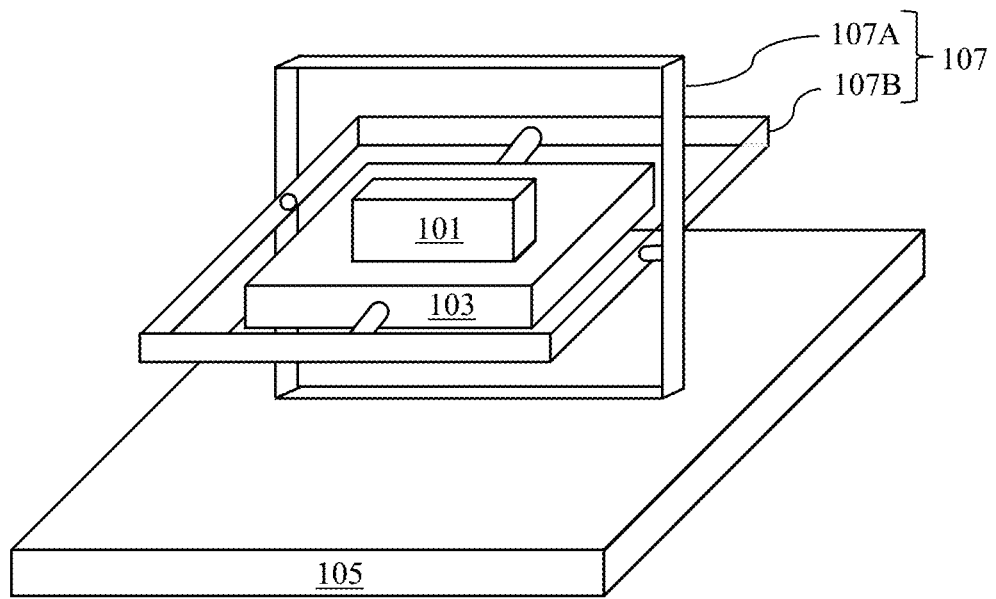
FIG. 1B illustrates a hybrid inertial navigation system attached to a vehicle in accordance with some embodiments.

FIGS. 1A and 1B illustrate a hybrid INS 101 mounted on a vehicle 105 in accordance with some embodiments. Referring to FIG. 1A, in some embodiments, the hybrid INS 101 is placed on a platform 103, which is mounted on the vehicle 105. In some embodiments, a vibration isolation system (not shown) may be coupled between the platform 103 and the vehicle 105. The vibration isolation system may be configured to isolate the platform 103 with the hybrid INS 101 from vibrations due to motion of the vehicle 105. The vehicle 105 may be an automobile, a ship, a submarine, an airplane, a rocket, or the like. In some embodiments, the hybrid INS 101 is configured to determine position, velocity, and attitude of the vehicle 105. In the embodiment illustrated in FIG. 1A, the platform 103 is directly mounted on the vehicle 105. In other embodiments, the platform 103 may be mounted on the vehicle 105 using a desired mounting system. Such an embodiment is illustrated in FIG. 1B, where the platform 103 is mounted on the vehicle 105 using a gimbal mount 107. Referring to FIG. 1B, in some embodiments, the gimbal mount 107 comprises an outer gimbal 107A that is directly mounted on the vehicle 105 and an inner gimbal 107B that is attached to the platform 103. In some embodiments, the gimbal mount 107 may comprise a motor (not shown) that is configured to control and change angles of the inner gimbal 107B and the platform 103.

Figure 2:
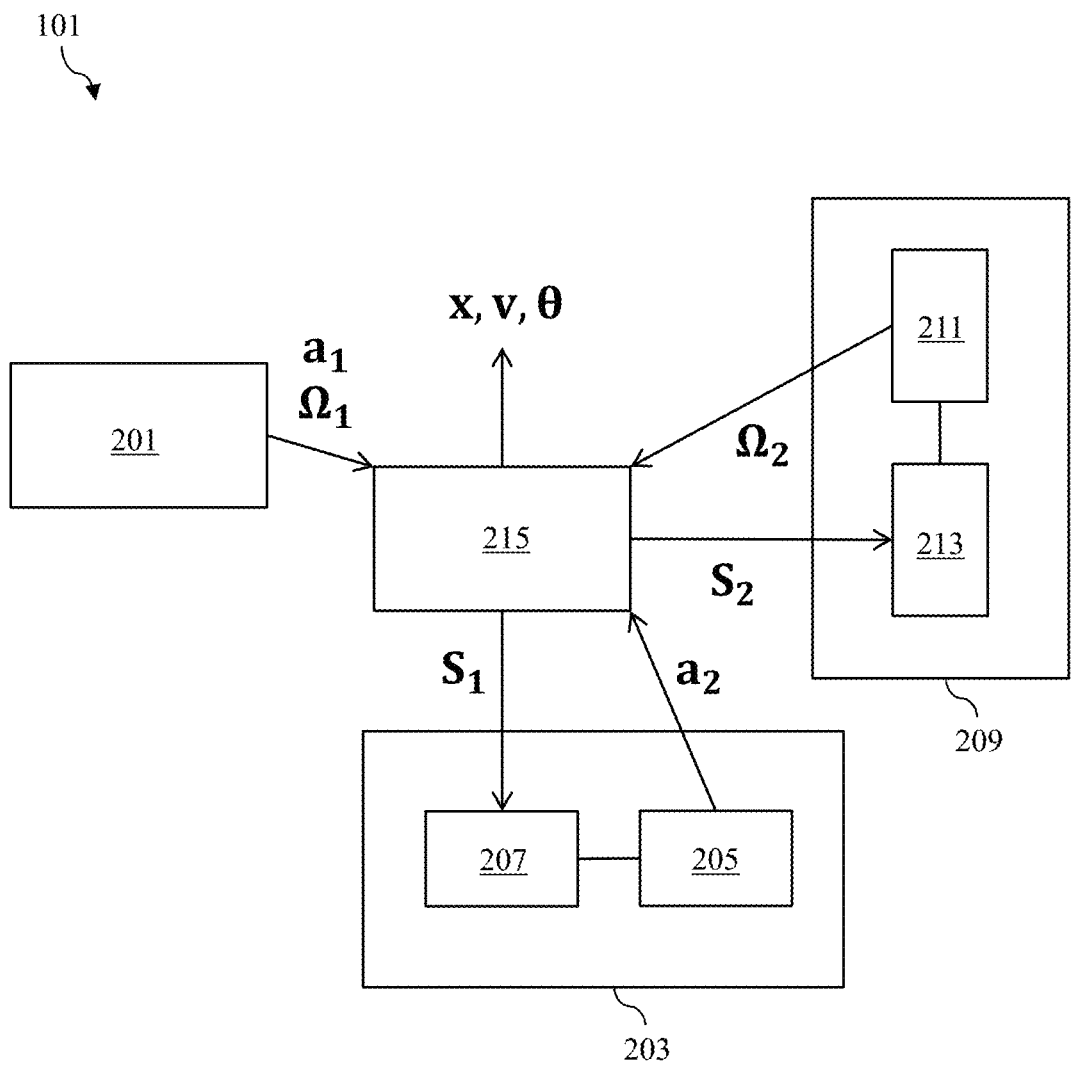
FIG. 2 illustrates a schematic view of a hybrid inertial navigation system in accordance with some embodiments.

FIG. 2 illustrates a schematic view of the hybrid INS 101 in accordance with some embodiments. In some embodiments, the hybrid INS 101 comprises a conventional IMU 201 and LPAI inertial sensors, such as an LPAI-ACC 203 and an LPAI-GYRO 209. The conventional IMU 201 may be a 6 degrees-of-freedom IMU sensor comprising three conventional accelerometers (IMU-ACCs) and three conventional gyroscopes (IMU-GYROs). The conventional IMU 201 is configured to measure acceleration $a_1=(a_{1x}, a_{1y}, a_{1z})$ (along three orthogonal axes) and angular velocity $\Omega_1=(\Omega_{1x}, \Omega_{1y}, \Omega_{1z})$ (around three orthogonal axes).

In some embodiments, the LPAI-ACC 203 comprises a sensor head 205 and a Raman laser system 207 coupled to the sensor head 205. The LPAI-ACC 203 is configured to measure acceleration $a_2=(a_{2x}, a_{2y}, a_{2z})$ (along three orthogonal axes) through performing light-pulse atom interferometry. The Raman laser system 207 comprises laser generation and control systems (not individually illustrated).

In some embodiments, the LPAI-GYRO 209 comprises a sensor head 211 and a Raman laser system 213 coupled to the sensor head 211. The LPAI-GYRO 209 is configured to measure angular velocity $\Omega_2=(\Omega_{2x}, \Omega_{2y}, \Omega_{2z})$ (around three orthogonal axes) through performing light-pulse atom interferometry. The Raman laser system 213 comprises laser generation and control systems (not individually illustrated).

In some embodiments, the hybrid INS 101 further comprises a processing system (PS) 215 coupled to the conventional IMU 201, the LPAI-ACC 203, and the LPAI-GYRO 209. As described below in greater detail, the PS 215 is configured to perform a feedforward correction on the LPAI-ACC 203 and the LPAI-GYRO 209 to correct for the motion of the platform 103 caused by the motion of the vehicle 105 (see FIGS. 1A and 1B). In some embodiments, the PS 215 is further configured to determine position (x), velocity (v), and attitude (θ) of the vehicle 105 (see FIGS. 1A and 1B).

Figure 3:
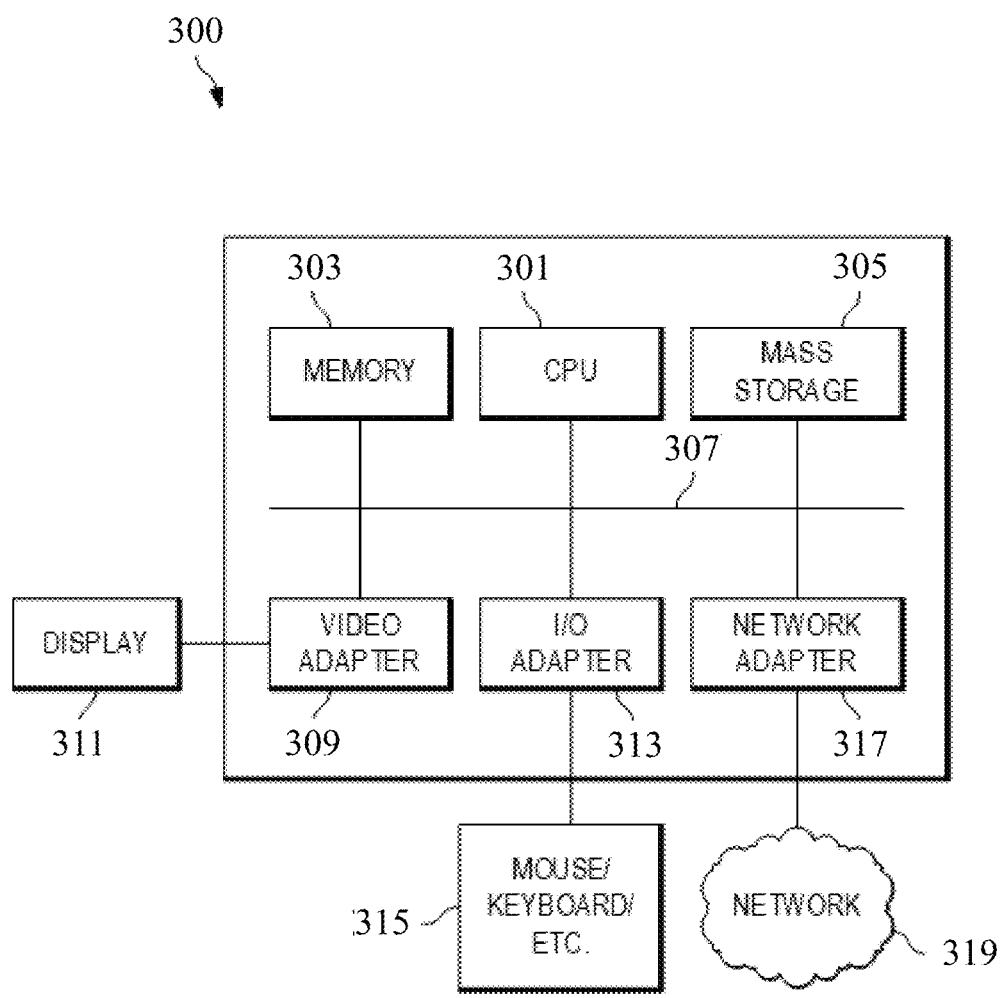
FIG. 3 illustrates a processing system in accordance with some embodiments.

FIG. 3 illustrates a schematic block diagram of a PS 300, which may be implemented as the PS 215 of the hybrid INS 101 illustrated in FIG. 2. The PS 300 may include, for example, a processing unit 301, a memory 303, and a mass storage device 305 connected to a bus 307. The mass storage device 305 may be configured to store feedforward correction and inertial navigation algorithms. The memory 303 may be configured to load the feedforward correction and inertial navigation algorithms from the mass storage device 305. The processing unit 301 may be configured to execute the feedforward correction and inertial navigation algorithms loaded into the memory 303. The processing unit 301 may be a microprocessor, a central processing unit (CPU), a field-programmable gate array (FPGA), a graphical processing unit (GPU), neural processing unit (NPU), a combination thereof, or the like.

The PS 300 may further include, if desired or needed, a video adapter 309 to provide connectivity to a display 311 and an input-output (I/O) adapter 313 to provide an input/output interface for one or more input/output devices 315, such as a mouse, keyboard, printer, tape drive, CD drive, or the like. The PS 300 may also include a network interface 317, which may be implemented using a network adapter configured to be coupled to a wired link, such as an Ethernet cable, USB interface, or the like, and/or a wireless/cellular link for communications with a network 319. The network interface 317 may also comprise a suitable receiver and transmitter for wireless communications. It should be noted that the PS 300 may include other components. For example, the PS 300 may include power supplies, cables, a motherboard, removable storage media, cases, and the like. These other components, although not shown, are considered part of the PS 300.

Figure 4:
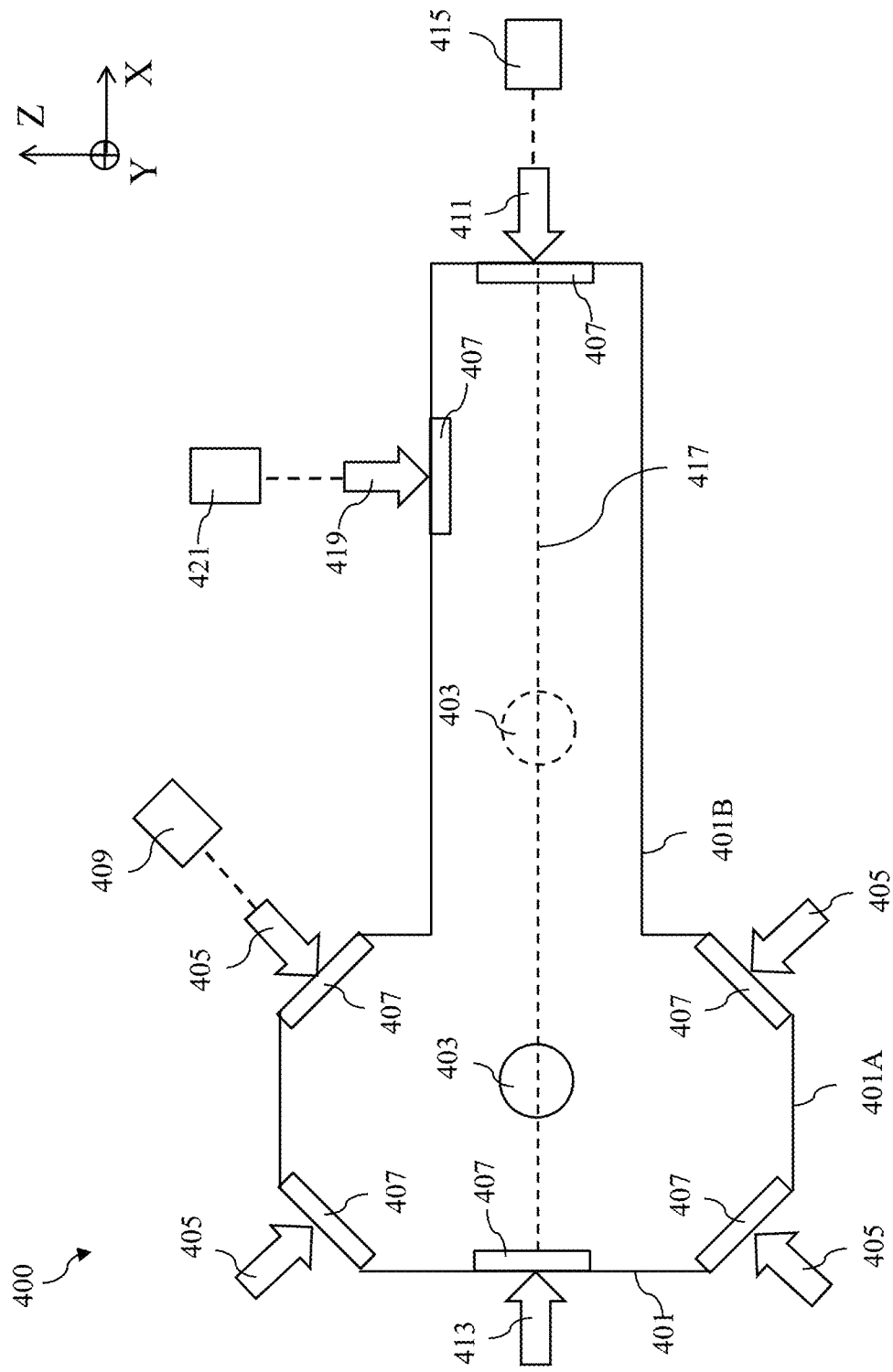
FIG. 4 illustrates a light-pulse atom interferometer (LPAI) accelerometer in accordance with some embodiments.

FIG. 4 illustrates a light-pulse atom interferometer (LPAI) accelerometer, i.e., an LPAI-ACC, 400 in accordance with some embodiments. In the illustrated embodiment, the LPAI-ACC 400 is configured to measure acceleration along X axis. In other embodiments, the LPAI-ACC 400 may be configured to measure accelerations along Y and Z axes. Three orthogonal accelerometers (measuring accelerations along X, Y, and Z axes), such as the LPAI-ACC 400, may be implemented as the LPAI-ACC 203 of the hybrid INS 101 illustrated in FIG. 2.

The LPAI-ACC 400 comprises a vacuum chamber 401 comprising a first region 401A, where an atomic cloud 403 is trapped and cooled, and a second region 401B, where light-pulse atom interferometry is performed on the atomic cloud 403. The first region 401A may be also referred to as a trapping/cooling region. The second region 401B may be also referred to as an interferometry region. In some embodiments, the atomic cloud 403 comprises $^{133}$Cs atoms, $^{87}$Rb atoms, or other suitable atoms. In some embodiments, the vacuum chamber 401 is coupled to a vacuum pump (not shown) to maintain a desired pressure within the vacuum chamber 401.

In some embodiments, the atomic cloud 403 is trapped and cooled within the first region 401A of the vacuum chamber 401 using a magneto-optical trap (MOT). The MOT makes use of three mutually orthogonal, counter-propagating pairs of laser beams 405 and a quadrupole magnetic field (not illustrated). In FIG. 4, two mutually orthogonal, counter-propagating pairs of laser beams 405 are illustrated. The third counter-propagating pair of laser beams 405 is along the Y axis and is not shown in FIG. 4 for clarity of presentation. In some embodiments, the quadrupole magnetic field is generated by pair of coils (not shown) having opposite electrical currents, such as anti-Helmholtz coils.

In some embodiments, the laser beams 405 are fiber coupled to the first region 401A of the vacuum chamber 401 through transparent windows 407. In some embodiments, the laser beams 405 are circularly polarized, such that laser beams corresponding to the same counter-propagating pair have opposite circular polarizations. In some embodiments, the laser beams 405 are generated by a single laser apparatus 409. In some embodiments, optical components are used to form the six laser beams 405 from a single laser beam generated by the laser apparatus 409. The optical components may comprise waveplates, beam splitters, mirrors, the like, or combinations thereof. In some embodiments, the atomic cloud 403 (illustrated by a solid circle) is cooled using the MOT to an average atom temperature of about 5 to about 15 K. In some embodiments, the cooling process comprises sub-Doppler cooling methods, such as Sisyphus cooling or the like.

The LPAI-ACC 400 further comprises counter-propagating Raman laser beams 411 and 413 that are coupled to the vacuum chamber 401. The Raman laser beams 411 and 413 are configured to propagate within the second region 401B of the vacuum chamber 401 and manipulate the atomic cloud 403 during light-pulse atom interferometry operations. In some embodiments, the Raman laser beams 411 and 413 are fiber coupled to the vacuum chamber 401 through transparent windows 407. In some embodiments, the Raman laser beams 411 and 413 are generated by a single laser apparatus 415. In some embodiments, optical components are used to form the Raman laser beams 411 and 413 from a single laser beam generated by the laser apparatus 415. The optical components may comprise waveplates, beam splitters, mirrors, the like, or combinations thereof.

The LPAI-ACC 400 comprises a sensing axis 417, which is an axis of propagation for the Raman laser beams 411 and 413. The LPAI-ACC 400 is configured to sense accelerations along the sensing axis 417. In the illustrated embodiment, the sensing axis 417 is parallel to X axis. In other embodiments, the LPAI-ACC 400 may be configured such that the sensing axis 417 is parallel to Y axis or Z axis. In some embodiments when the sensing axis 417 is along the gravity force, the LPAI-ACC 400 is configured to sense the free-fall acceleration due to gravity. In such embodiments, the LPAI-ACC 400 is configured as a gravimeter.

The LPAI-ACC 400 further comprises a probing laser beam 419 that is coupled to the vacuum chamber 401 and that is configured to probe the atomic cloud 403 after completing light-pulse atom interferometry operations. In some embodiments, the probing laser beam 419 is fiber coupled to the vacuum chamber 401 through a transparent window 407. In some embodiments, the probing laser beam 419 is generated by a laser apparatus 421. In some embodiments, states of atoms in the atomic cloud 403 may be detected using fluorescence detection, absorption detection, or the like. As described below in greater detail, during the operation of the LPAI-ACC 400, the atomic cloud 403 (illustrated by the dashed circle) is released from the MOT and propagates along the second region 401B due to acceleration. Subsequently, a sequence of Raman pulses from the Raman laser beams 411 and 413 are applied to the atomic cloud 403 to perform light-pulse atom interferometry operations.

Referring further to FIG. 4, the vacuum chamber 401, the laser systems 409 and 421, and the anti-Helmholtz coils (not illustrated) may be collectively referred as a sensor head and may be implement as the sensor head 205 of the LPAI-ACC 203 (see FIG. 2). The Raman laser system 415 may be implemented as the Raman laser system 207 of the LPAI-ACC 203 (see FIG. 2).

Figure 5:
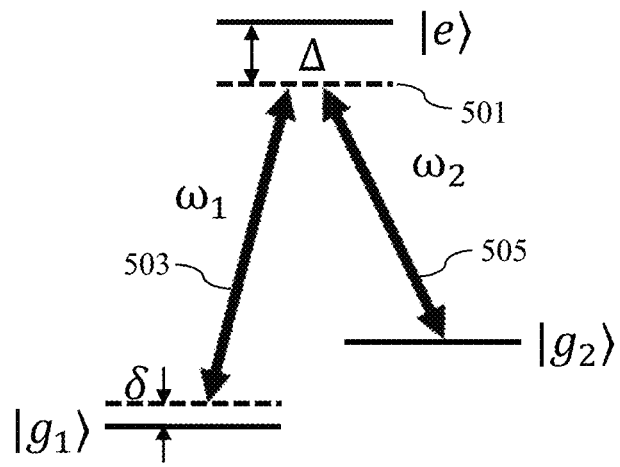
FIG. 5 illustrates energy levels of an atom for stimulated Raman transitions in accordance with some embodiments.

FIG. 5 illustrates energy levels of an atom in the atomic cloud 403 (see FIG. 4) for stimulated Raman transitions in accordance with some embodiments. In some embodiments, the atom has hyperfine-split ground states $|g_1\rangle$ and $|g_2\rangle$, and an excited state $|e\rangle$. The counter-propagating, Doppler-sensitive Raman laser beams 411 and 413 (see FIG. 4), having polarization configurations of $\sigma^+\sigma^+$, $\sigma^-\sigma^-$, or lin-perp-lin, are configured to drive the microwave transition (e.g., the atomic clock transition), between the hyperfine-split ground states $|g_1\rangle$ and $|g_2\rangle$ and provide momentum kicks, $\hbar k_{eff}$, to one of the ground states, where $k_{eff}$ is an effective wavevector of the Raman laser fields. This is accomplished by a two-photon process, where an atom in the state $|g_1\rangle$ is transferred to a virtual excited state (illustrated by a dashed line 501 in FIG. 5) by the Raman laser beam 411 (illustrated by an arrow 503 in FIG. 5) and then to the state $|g_2\rangle$ via stimulated emission by the Raman laser beam 413 (illustrated by an arrow 505 in FIG. 5). In some embodiments, the virtual excited state 501 is detuned from the excited state $|e\rangle$ by a single-photon detuning $\Delta$. In some embodiments, a frequency $\omega_2$ of the Raman laser beam 413 (illustrated by an arrow 505 in FIG. 5) is resonant with a transition $|e\rangle \to |g_2\rangle$ with an offset $\Delta$ (the single-photon detuning). In some embodiments, a frequency $\omega_1$ of the Raman laser beam 411 (illustrated by an arrow 503 in FIG. 5) is resonant with a transition $|g_1\rangle \to |e\rangle$ with an offset $\delta$ (the two-photon detuning) in addition to the offset $\Delta$ (the single-photon detuning). Under Raman transitions, each atom of the atomic cloud 403 (see FIG. 4) effectively behaves as a two-level system with states $|g_1\rangle$ and $|g_2\rangle$. In some embodiments when the atomic cloud 403 comprises $^{133}$Cs atoms, the states $|g_1\rangle = |F=3, m_f=0\rangle$ and $|g_2\rangle = |F=4, m_f=0\rangle$ are hyperfine-split states of the ground state $|6S_{1/2}\rangle$, and the state $|e\rangle$ is the excited state $|6P_{3/2}\rangle$. In some embodiments when the atomic cloud 403 comprises $^{87}$Rb atoms, the states $|g_1\rangle = |F=1, m_f=0\rangle$ and $|g_2\rangle = |F=2, m_f=0\rangle$ are hyperfine-split states of the ground state $|5S_{1/2}\rangle$, and the state $|e\rangle$ is the excited state $|5P_{3/2}\rangle$.

Figure 6:
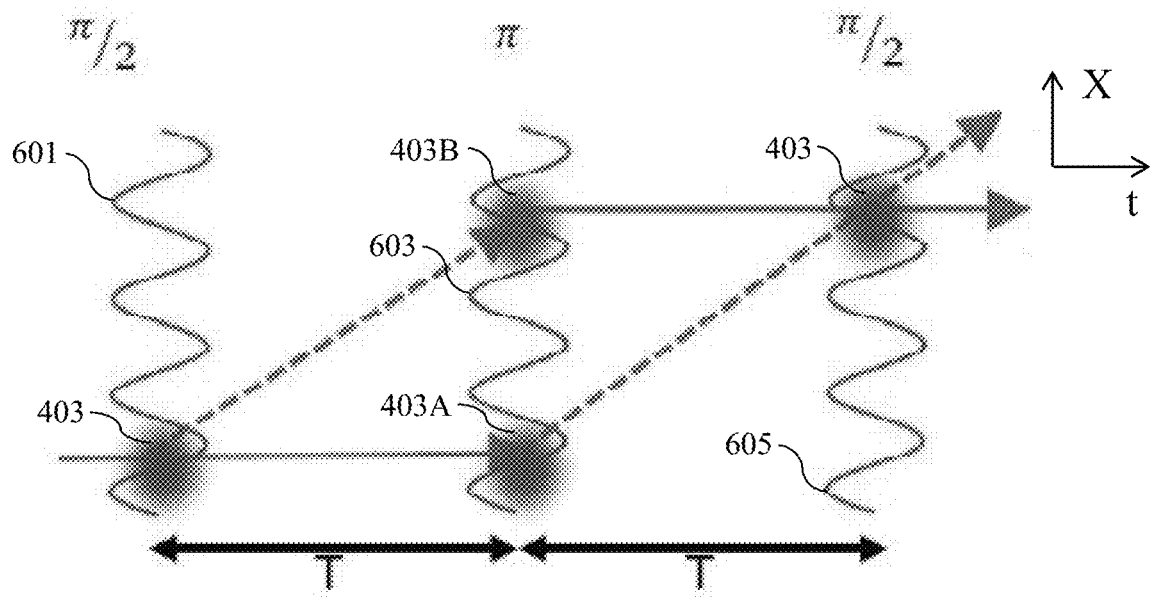
FIG. 6 illustrates a schematic of operations performed on an atomic cloud during operating an LPAI accelerometer in accordance with some embodiments.

FIG. 6 illustrates a schematic of operations performed on the atomic cloud 403 during operation of the LPAI-ACC 400 (see FIG. 4) in accordance with some embodiments. In some embodiments, after trapping and cooling the atomic cloud 403 (illustrated by the solid circle in FIG. 4) in the MOT, the MOT is turned off and atomic cloud 403 (illustrated by the dashed circle in FIG. 4) is released or launched along the sensing axis 417. The atomic cloud 403 is then subject to inertial forces such as accelerations and rotations in all three dimensions and is allowed to move in all three dimensions. Accordingly, the LPAI-ACC 400 may be also referred to as a free-space LPAI accelerometer.

After releasing the atomic cloud 403, a sequence of Raman pulses from the Raman laser beams 411 and 413 (see FIG. 4) is applied to the atomic cloud 403. In some embodiments, the sequence of Raman pulses comprises three Raman pulses 601, 603, and 605, which split, redirect, and re-combine an atomic wavepacket of the atomic cloud 403, respectively. In some embodiments, the first Raman pulse 601 is a $\pi/2$-pulse, the second Raman pulse 603 is a $\pi$-pulse, and the third Raman pulse 605 is a $\pi/2$-pulse. The Raman pulses 601, 603, and 605 propagate along the sensing axis 417 of the LPAI-ACC 400 (see FIG. 4). Furthermore, during light-pulse atom interferometry operations (i.e., while applying the Raman pulses 601, 603, and 605), the LPAI-ACC 400 does not have a Sagnac area (i.e., an area enclosed by atoms of the atomic cloud 403 in space within the vacuum chamber 401 during light-pulse atom interferometry operations). However, the LPAI-ACC 400 may have a non-zero Sagnac area due to motion of atoms transverse to the sensing axis 417.

In some embodiments when atoms in the atomic cloud 403 are in the state $|g_1, p_0\rangle$, with $p_0$ being an initial momentum of the atoms, the first Raman pulse 601 ($\pi/2$-pulse) acts as a beam splitter creating a superposition between the two atomic states of $|g_1, p_0\rangle$ and $|g_2, p_0+\hbar k_{eff}\rangle$ (see FIG. 5) by creating the momentum kicked state $|g_2, p_0+\hbar k_{eff}\rangle$ from $|g_1, p_0\rangle$ due to absorption recoil. After performing the first Raman pulse 601, two atomic wavepackets in the states $|g_1, p_0\rangle$ and $|g_2, p_0+\hbar k_{eff}\rangle$, respectively, are allowed to propagate freely for an interrogation time T. As time progresses, due to atoms in different atomic states having different momenta, the atomic cloud 403, the initial wavepacket, splits into two atomic wavepackets 403A and 403B (see FIG. 6), with the atomic wavepacket 403A comprising atoms in the state $|g_1, p_0\rangle$ and the atomic wavepacket 403B comprising atoms in the state $|g_2, p_0+\hbar k_{eff}\rangle$, After the first interrogation time T has elapsed, the second Raman pulse 603 ($\pi$-pulse) is applied to the atomic wavepackets 403A and 403B. The second Raman pulse 603 acts as a mirror turning the state $|g_1, p_0\rangle$ to the state $|g_2, p_0+\hbar k_{eff}\rangle$, and the state $|g_2, p_0+\hbar k_{eff}\rangle$ to the state $|g_1, p_0\rangle$. After performing the second Raman pulse 603, the atomic wavepacket 403A comprises atoms in the state $|g_2, p_0+\hbar k_{eff}\rangle$ and the atomic wavepacket 403B comprises atoms in the state $|g_1, p_0\rangle$. After performing the second Raman pulse 603, the atomic wavepacket 403A and 403B are allowed to propagate freely for an interrogation time T. As time progresses, due to atoms in different atomic states having different momenta, the two atomic wavepackets 403A and 403B converge, such that after the interrogation time T has elapsed, the atomic wavepacket 403A overlaps with the atomic wavepacket 403B (see FIG. 6).

After the second interrogation time T has elapsed, the third Raman pulse 605 ($\pi/2$-pulse) is applied to the atomic wavepacket 403A in the state $|g_2, p_0 + \hbar k_{eff}\rangle$ and the atomic wavepacket 403B in the state $|g_1, p_0\rangle$, recombining the atomic wavepackets 403A and 403B to interfere them. The third Raman pulse 605 acts as a beam combiner to create a superposition between two states $|g_1, p_0\rangle$ to the state $|g_2, p_0 + \hbar k_{eff}\rangle$ from the atomic wavepackets 403A and 403B. After performing the third Raman pulse 605 (i.e., interfering atomic wavepackets), atomic states of atoms in the atomic cloud 403, the final atomic wavepacket, are detected using the probing laser beam 419 (see FIG. 4) and the probability $Pg_2$ of atoms being in the state $|g_1, p_0\rangle$ is measured as the phase of the third Raman pulse 605 is scanned. Through this procedure, light-pulse atom interferometry fringes are measured. In some embodiments, atomic states may be detected using a fluorescence detection, an absorption detection, or the like. The values of acceleration a is encoded in the probability $Pg_2 = \frac{1}{2}(1 - \cos \Delta\phi)$, where $\Delta\phi = k_{eff} - aT^2$. Accordingly, the values of acceleration a is measured by detecting atomic fringes.

Referring further to FIG. 4, as described below in greater detail, performance of the LPAI-ACC 400 is affected by various dynamic phenomena. In some embodiments when the LPAI-ACC 400 is implemented as the LPAI-ACC 203 of the hybrid INS 101, motion of the platform 103 (see FIGS. 1A and 1B) of the hybrid INS 101 affects performance of the LPAI-ACC 400. The various dynamic phenomena may include on-axis accelerations and rotations (such as accelerations and rotations along the sensing axis 417) and cross-axis accelerations and rotations (such as accelerations and rotations perpendicular to the sensing axis 417) caused by motion of the platform 103. Performance of the LPAI-ACC 400 is not significantly affected by on-axis rotations, since on-axis rotations do not shift the Raman laser beams 411 and 413 away from the sensing axis 417.

Figure 7:
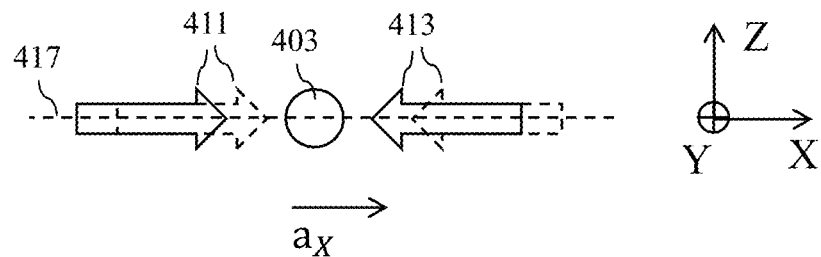
FIG. 7 illustrates a dynamic phenomenon affecting the performance of an LPAI accelerometer in accordance with some embodiments.

FIG. 7 illustrates a dynamic phenomenon affecting the performance of the LPAI-ACC 400 (see FIG. 4) in accordance with some embodiments. In some embodiments when the LPAI-ACC 400 is implemented as the LPAI-ACC 203 of the hybrid INS 101 (see FIG. 2), on-axis acceleration $a_X$ of the platform 103 (see FIGS. 1A and 1B) on which the hybrid INS 101 is placed causes translation of the Raman laser beams 411 and 413 (illustrated by the dashed arrows) along the sensing axis 417. This results in Doppler-shifted Raman laser beams 411 and 413 and chirped atom interferometry fringes, which limits the performance of light-pulse atom interferometry in the LPAI-ACC 400 (see FIG. 4). As described below in greater detail, a feedforward method is used to correct for on-axis acceleration effects.

Figure 8:
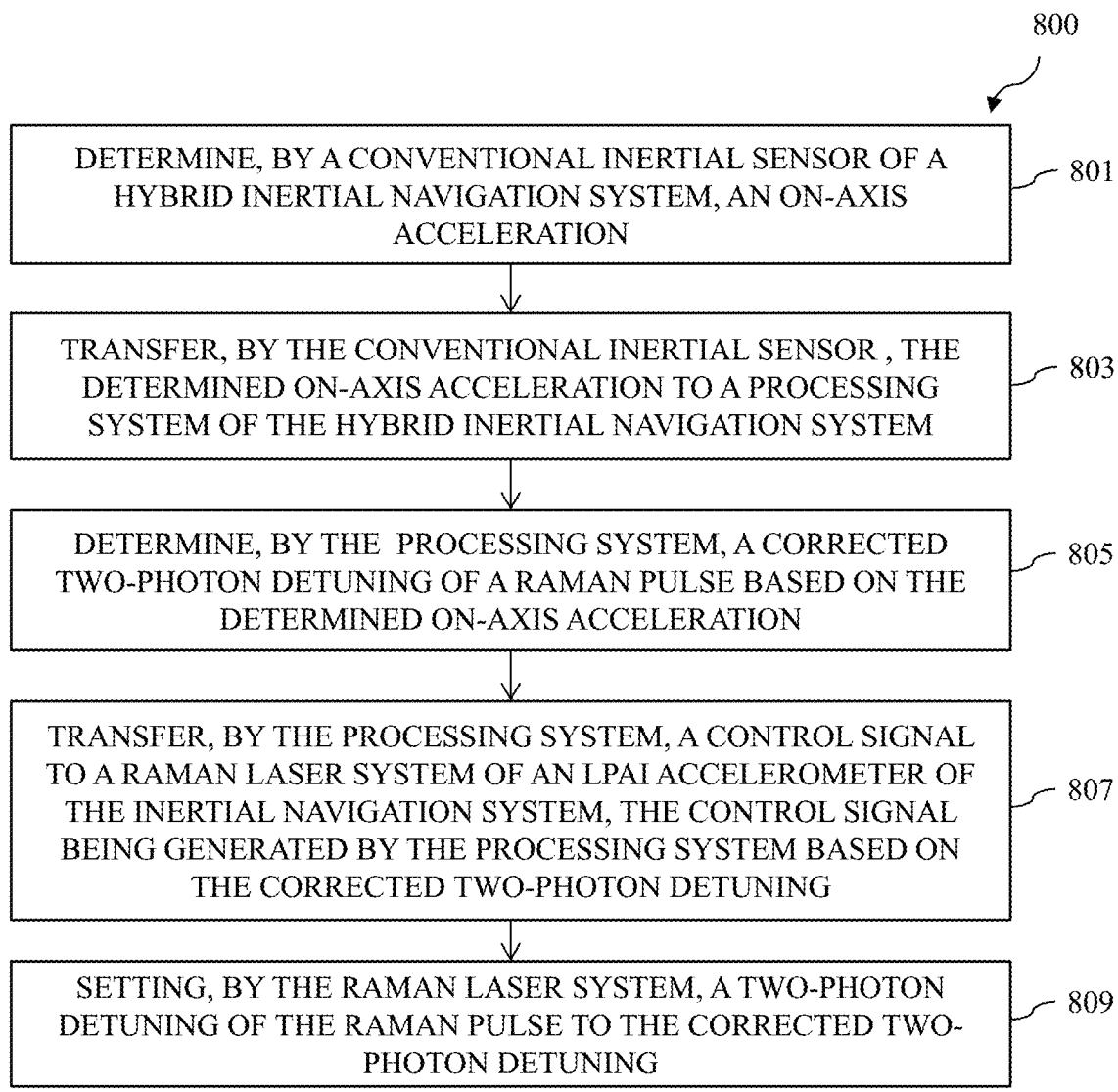
FIG. 8 is a flow diagram illustrating a feedforward method for correcting on-axis acceleration effects in accordance with some embodiments.

FIG. 8 is a flow diagram illustrating a feedforward (FF) method 800 for correcting on-axis acceleration effects in accordance with some embodiments. In some embodiments when the LPAI-ACC 400 (see FIG. 4) is implemented as the LPAI-ACC 203 of the hybrid INS 101 (see FIG. 2), the PS 215 and the conventional IMU 201 of the hybrid INS 101 are used to perform steps of the FF method 800. As the feedforward correction operations (FF-COs) of FF method 800 are applied to the LPAI-ACC 203, the FF method 800 may also be termed LPAI-ACC FF-COs.

Referring to FIGS. 2, 4, 7, and 8, the FF method 800 starts with step 801, when the conventional IMU 201 of the hybrid INS 101 determines an on-axis acceleration $a_X$. In step 803, the conventional IMU 201 transfers the determined on-axis acceleration $a_X$ to the PS 215 of the hybrid INS 101. In step 805, the PS 215 estimates trajectories and internal states of atoms in the atomic cloud 403 (see FIG. 4) using a light-pulse atom interferometry (LPAI) physical model and determines a corrected two-photon detuning $\delta_{cor}$ of at least one of the Raman pulses based on the determined on-axis acceleration $a_X$. The Raman pulse may be the first Raman pulse 601, the second Raman pulse 603, or the third Raman pulse 605 (see FIG. 6). In some embodiments, the corrected two-photon detuning $\delta_{cor}$ is determined according to equation $\delta_{cor}(t) = k_{eff} - a_X t$, where t is time. In step 807, the PS 215 generates a control signal $S_1$ based on the corrected two-photon detuning $\delta_{cor}$ and transfers the control signal $S_1$ to the Raman laser system 207 of the LPAI-ACC 203 of the hybrid INS 101. In step 809, the Raman laser system 207 of the LPAI-ACC 203 sets the two-photon detuning $\delta$ (see FIG. 5) of the Raman beam to the corrected two-photon detuning $\delta_{cor}$. In some embodiments, the FF method 800 is performed before applying the at least one of the Raman pulses to the atomic cloud 403. In other embodiments, the FF method 800 is performed while applying the at least one of the Raman pulses to the atomic cloud 403.

Figure 9:
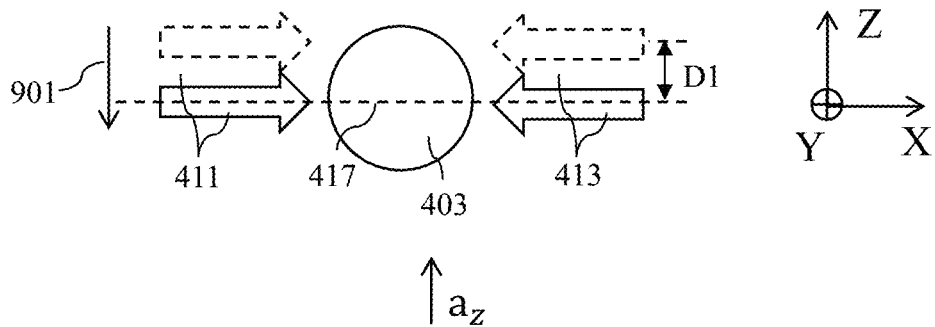
FIG. 9 illustrates a dynamic phenomenon affecting the performance of an LPAI accelerometer in accordance with some embodiments.

FIG. 9 illustrates a dynamic phenomenon affecting the performance of an LPAI-ACC in accordance with some embodiments. In some embodiments when the LPAI-ACC 400 (see FIG. 4) is implemented as the LPAI-ACC 203 of the hybrid INS 101 (see FIG. 2), cross-axis acceleration $a_Z$ of the platform 103 (see FIGS. 1A and 1B) on which the hybrid INS 101 is placed causes translation or shift of the Raman laser beams 411 and 413 (illustrated by the dashed arrows) perpendicular to the sensing axis 417. In some embodiments, the Raman laser beams 411 and 413 are shifted in a direction of the cross-axis acceleration $a_Z$ by a distance D1. Cross-axis acceleration degrades the overlap between the atomic cloud 403 and intensity profiles of the Raman laser beams 411 and 413, which results in reduced fringe visibility of the interferometry signal. As described below in greater detail, an FF method is used to correct for cross-axis acceleration effects.

Figure 10:
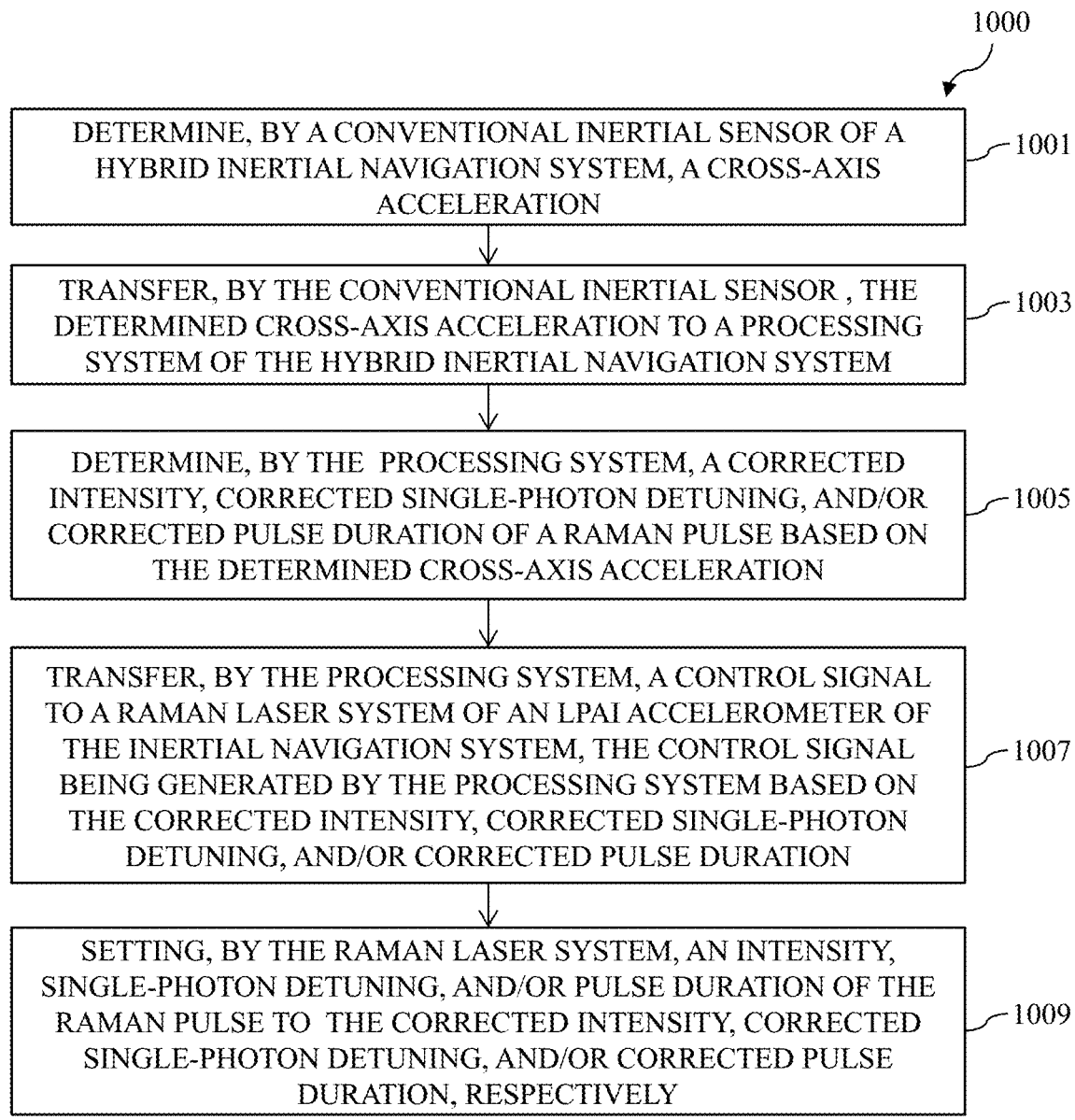
FIG. 10 is a flow diagram illustrating a feedforward method for correcting cross-axis acceleration effects in accordance with some embodiments.

FIG. 10 is a flow diagram illustrating an FF method 1000 for correcting cross-axis acceleration effects in accordance with some embodiments. In some embodiments when the LPAI-ACC 400 (see FIG. 4) is implemented as the LPAI-ACC 203 of the hybrid INS 101 (see FIG. 2), the PS 215 and the conventional IMU 201 of the hybrid INS 101 are used to perform steps of the FF method 1000. As the feedforward correction operations (FF-COs) of FF method 1000 are applied to the LPAI-ACC 203, the FF method 1000 may also be termed LPAI-ACC FF-COs.

Referring to FIGS. 2, 4, 9, and 10, the FF method 1000 starts with step 1001, when the conventional IMU 201 of the hybrid INS 101 determines a cross-axis acceleration $a_Z$. In step 1003, the conventional IMU 201 transfers the determined cross-axis acceleration $a_Z$ to the PS 215 of the hybrid INS 101. In step 1005, the PS estimates trajectories and internal states of atoms in the atomic cloud 403 using an LPAI physical model and determines a corrected intensity (or a corrected amplitude), corrected single-photon detuning $\Delta$cor, and/or corrected pulse duration of at least one of the Raman pulses based on the determined cross-axis acceleration $a_Z$. The Raman pulse may be the first Raman pulse 601, the second Raman pulse 603, or the third Raman pulse 605 (see FIG. 6). In step 1007, the PS 215 generates a control signal $S_1$ based on the corrected intensity (or the corrected amplitude), corrected single-photon detuning $\Delta$cor, and/or corrected pulse duration of the at least one Raman pulses and transfers the control signal $S_1$ to the Raman laser system 207 of the LPAI-ACC 203 of the hybrid INS 101. In step 1009, the Raman laser system 207 of the LPAI-ACC 203 sets an intensity (or an amplitude), single-photon detuning $\Delta$ (see FIG. 5), and/or pulse duration of the at least one of the Raman pulses to the corrected intensity (or the corrected amplitude), corrected single-photon detuning Δcor, and/or corrected pulse duration, respectively. In some embodiments, the FF method 1000 is performed before applying the at least one of the Raman pulses to the atomic cloud 403. In other embodiments, the FF method 1000 is performed while applying the at least one of the Raman pulses to the atomic cloud 403.

In some embodiments, step 1005 comprises determining a corrected amplitude A(t) according to equation $A(t)=F(|r_c(t)|)A_0$, where $|r_c(t)|$ is a lateral displacement of atoms in the atomic cloud 403 (see FIG. 4) with respect to the shifted Raman laser beam 411 and 413, the function F is an amplitude increase factor, and $A_0$ is the nominal Raman laser amplitude suitable for the case where the center of the atom cloud 403 coincides with the Raman laser beam center. In some embodiments, the amplitude increase factor F as a function of the lateral displacement $|r_c(t)|$, a size of the atomic cloud 403, and a width of the Raman laser beams 411 and 413 is determined using a simulation such as, for example, a Monte Carlo simulation. In some embodiments, the lateral displacement $|r_c(t)|$ is determined from the determined cross-axis acceleration $a_Z$ using suitable kinematic equations. For increasing the feedforward processing efficiency, in some embodiments, the simulation results of the corrected amplitude A(t) for various dynamic scenarios may be prepared as lookup tables in a memory of the PS 215 or be pre-trained in deep neural networks of the PS 215.

Figure 11:
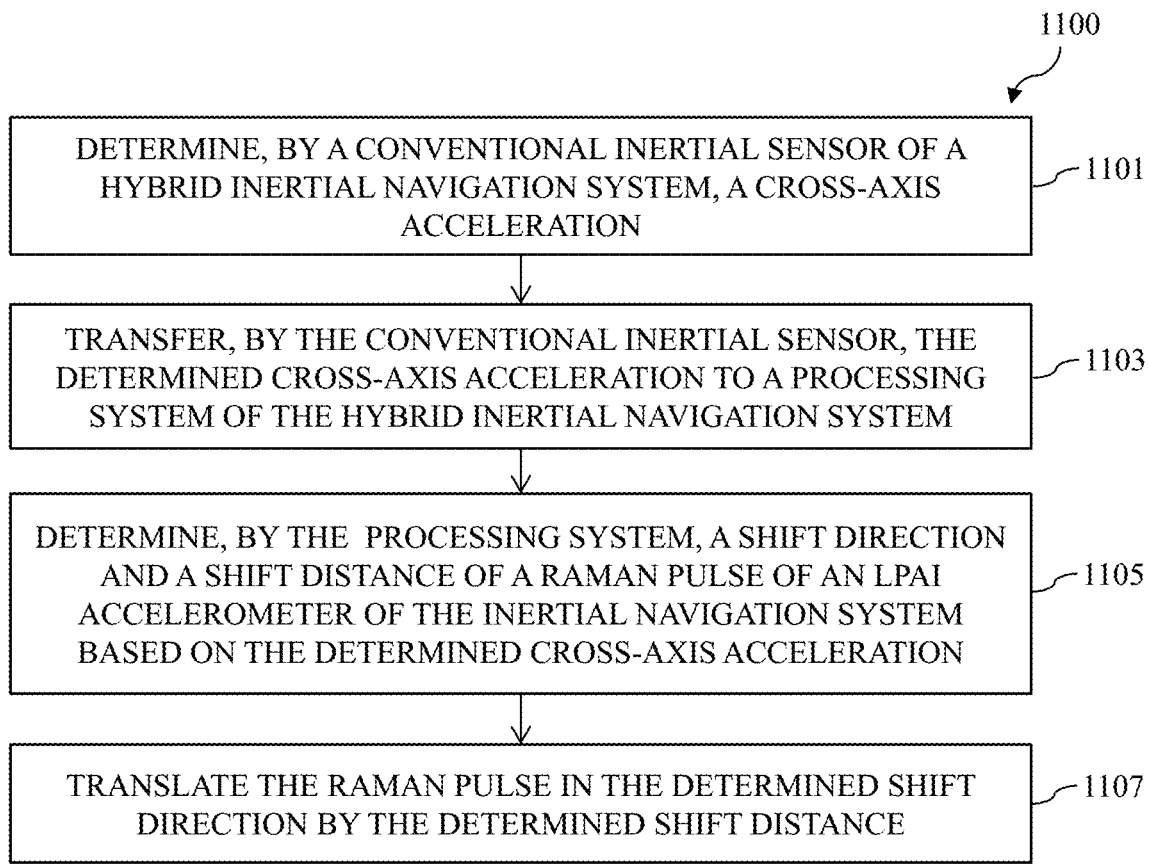
FIG. 11 is a flow diagram illustrating a feedforward method for correcting cross-axis acceleration effects in accordance with some embodiments.

FIG. 11 is a flow diagram illustrating an FF method 1100 for correcting cross-axis acceleration effects in accordance with some embodiments. In some embodiments when the LPAI-ACC 400 (see FIG. 4) is implemented as the LPAI-ACC 203 of the hybrid INS 101 (see FIG. 2), the PS 215 and the conventional IMU 201 of the hybrid INS 101 are used to perform steps of the FF method 1100. As the feedforward correction operations (FF-COs) of FF method 1100 are applied to the LPAI-ACC 203, the FF method 1100 may also be termed LPAI-ACC FF-COs.

Referring to FIGS. 2, 4, 9, and 11, the FF method 1100 starts with step 1101, when the conventional IMU 201 of the hybrid INS 101 determines a cross-axis acceleration $a_Z$. In step 1103, the conventional IMU 201 transfers the determined cross-axis acceleration $a_Z$ to the PS 215 of the hybrid INS 101. In step 1105, the PS 215 determines a shift direction 901 and a shift distance D1 of at least one Raman pulse of an LPAI-ACC 203 of the hybrid INS 101 based on the determined cross-axis acceleration $a_Z$. The Raman pulse may be the first Raman pulse 601, the second Raman pulse 603, or the third Raman pulse 605 (see FIG. 6). In some embodiments, the PS 215 determines the shift direction 901 as opposite to a direction of the determined cross-axis acceleration $a_Z$. In some embodiments, the PS 215 determines the shift distance D1 based on the determined cross-axis acceleration $a_Z$ by employing suitable kinematic equations while the phase lock of the Raman laser beams 411 and 413 is maintained. For example, the shift distance D1 may be determined by time-integrating the cross-axis acceleration $a_Z$. In step 1107, the at least one Raman pulse is translated in the shift direction 901 by the shift distance D1. In some embodiments, the FF method 1100 is performed before applying the at least one Raman pulse to the atomic cloud 403. In other embodiments, the FF method 1100 is performed while applying the at least one Raman pulse to the atomic cloud 403.

In some embodiments when the platform 103 of the hybrid INS 101 is directly mounted to the vehicle 105 (see FIG. 1A), step 1107 of the FF method 1100 includes generating, by the PS 215, a control signal $S_1$ based on the shift direction 901 and the shift distance D1 (see FIG. 9); transferring, by the PS 215, the control signal $S_1$ to the Raman laser system 207 of the LPAI-ACC 203 of the hybrid INS 101; and translating, by the Raman laser system 207 of the LPAI-ACC 203, the at least one Raman pulse in the shift direction 901 by the shift distance D1. In some embodiments, the Raman laser system 207 may use optical plates, mirrors, piezo tip-tilt stages, acousto-optic deflectors, electro-optic modulators, combinations thereof, or the like to translate the at least one Raman pulse.

In some embodiments when the platform 103 of the hybrid INS 101 is mounted to the vehicle 105 using the gimbal mount 107 (see FIG. 1B), step 1107 of the FF method 1100 includes generating, by the PS 215, a control signal $S_1$ based on the shift direction 901 and the shift distance D1 (see FIG. 9); transferring, by the PS 215, the control signal $S_1$ to the gimbal mount 107 (see FIG. 1B); and translating, by the gimbal mount 107, the platform 103 with the Raman laser system 207 placed on the platform 103, such that the at least one Raman pulse is translated in the shift direction 901 by the shift distance D1 due to translation of the gimbal mount 107. In some embodiments, a control system (not illustrated) of the gimbal mount 107 is used to translate the platform 103 with the Raman laser system 207 placed on the platform 103.

Figure 12:
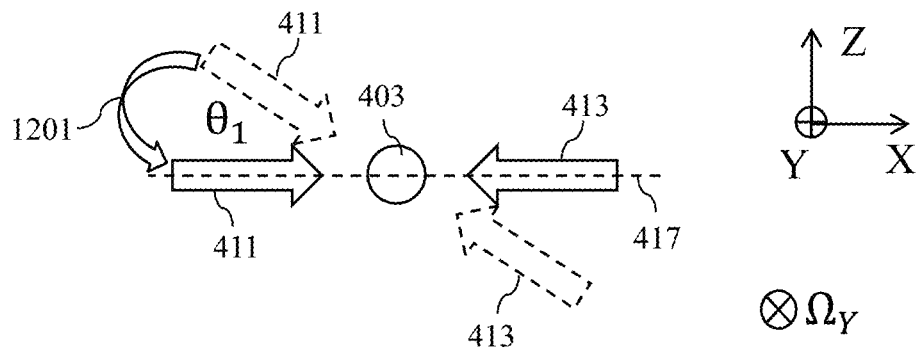
FIG. 12 illustrates a dynamic phenomenon affecting the performance of an LPAI accelerometer in accordance with some embodiments.

FIG. 12 illustrates a dynamic phenomenon affecting the performance of the LPAI-ACC 400 in accordance with some embodiments. In some embodiments when the LPAI-ACC 400 is implemented as the LPAI-ACC 203 of the hybrid INS 101 (see FIG. 2), cross-axis rotation with cross-axis angular velocity $\Omega_Y$ of the platform 103 (see FIGS. 1A and 1B) on which the hybrid INS 101 is placed causes rotation of the Raman laser beams 411 and 413 (illustrated by the dashed arrows) with respect to the to the sensing axis 417 by an angle $\theta_1$. Cross-axis rotation induces contrast loss of the light-pulse atom interferometry signal by, for example, degrading the overlap between split atomic clouds 403A and 403B (see FIG. 6).

Figure 13:
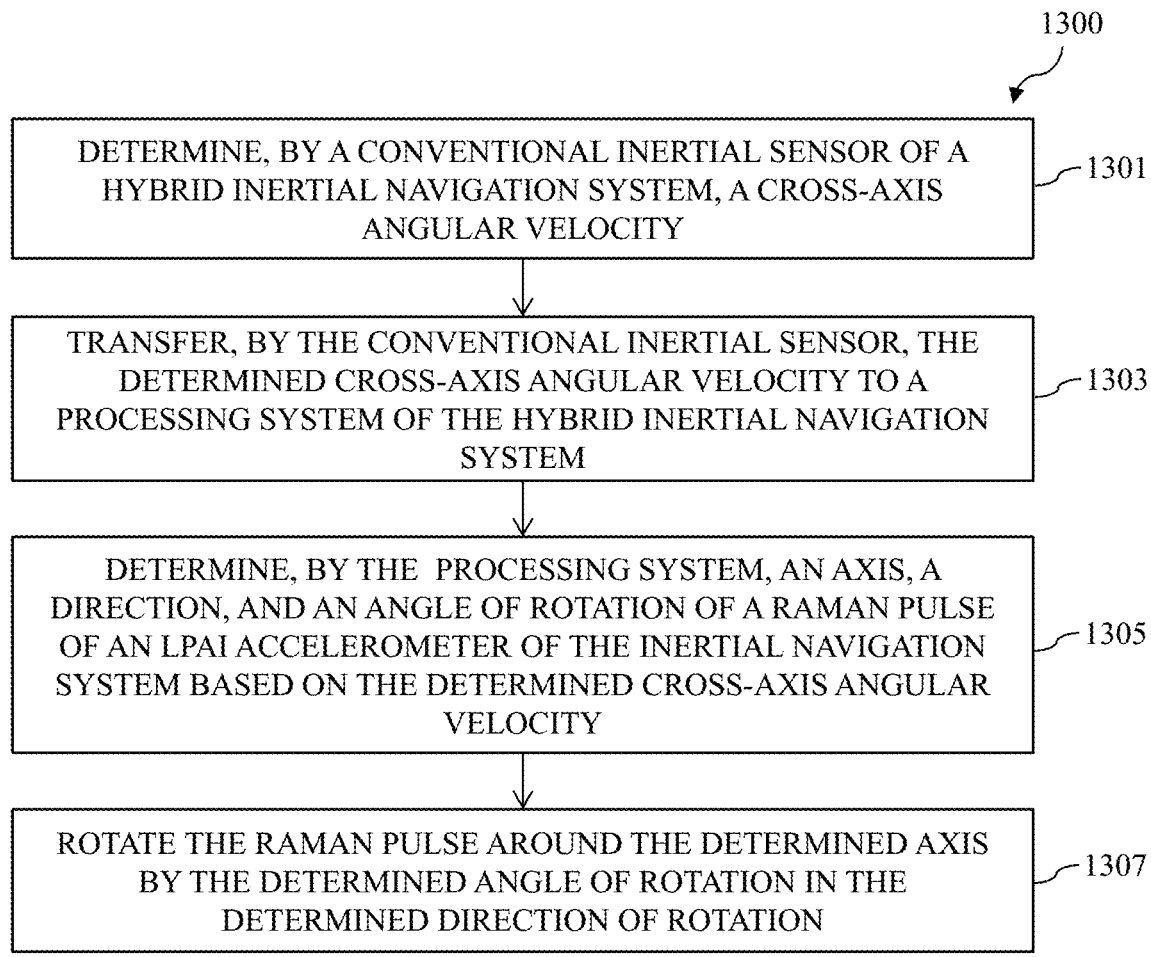
FIG. 13 is a flow diagram illustrating a feedforward method for correcting cross-axis rotation effects in accordance with some embodiments.

FIG. 13 is a flow diagram illustrating an FF method 1300 for correcting cross-axis rotation effects in accordance with some embodiments. In some embodiments when the LPAI-ACC 400 (see FIG. 4) is implemented as the LPAI-ACC 203 of the hybrid INS 101 (see FIG. 2), the PS 215 and the conventional IMU 201 of the hybrid INS 101 are used to perform steps of the FF method 1300. As the feedforward correction operations (FF-COs) of FF method 1300 are applied to the LPAI-ACC 203, the FF method 1300 may also be termed LPAI-ACC FF-COs.

Referring to FIGS. 2, 4, 12, and 13, the FF method 1300 starts with step 1301, when the conventional IMU 201 of the hybrid INS 101 determines a cross-axis angular velocity $\Omega_Y$. In step 1303, the conventional IMU 201 transfers the determined cross-axis angular velocity $\Omega_Y$ to the processing system 215 of the hybrid INS 101. In step 1305, the PS 215 determines an axis, a direction of rotation 1201, and an angle of rotation $\theta_1$ of at least one Raman pulse of an LPAI-ACC 203 of the hybrid INS 101 based on the determined cross-axis angular velocity $\Omega_Y$. The Raman pulse may be the first Raman pulse 601, the second Raman pulse 603, or the third Raman pulse 605 (see FIG. 6). In some embodiments, the PS 215 determines the axis of rotation to be along the determined cross-axis angular velocity $\Omega_Y$. In some embodiments, the PS 215 determines the direction of rotation 1201 to be opposite to a direction of rotation due to the determined cross-axis angular velocity $\Omega_Y$. In some embodiments, the PS 215 determines the angle of rotation $\theta_1$ based on the determined cross-axis angular velocity $\Omega_Y$ by employing suitable kinematic equations. For example, the angle of rotation $\theta_1$ may be the determined by time-integrating the determined cross-axis angular velocity $\Omega_Y$. In step 1307, the at least one Raman pulse is rotated around the determined axis by the determined angle of rotation $\theta_1$ in the determined direction of rotation 1201. In some embodiments, the FF method 1300 is performed before applying the at least one Raman pulse to the atomic cloud 403. In other embodiments, the FF method 1300 is performed while applying the at least one Raman pulse to the atomic cloud 403.

In some embodiments when the platform 103 of the hybrid INS 101 is directly mounted to the vehicle 105 (see FIG. 1A), step 1307 of the FF method 1300 includes generating, by the PS 215, a control signal $S_1$ based on the determined axis, the determined direction of rotation 1201, and the determined angle of rotation $\theta_1$ (see FIG. 12); transferring, by the PS 215, the control signal $S_1$ to the Raman laser system 207 of the LPAI-ACC 203 of the hybrid INS 101 (see FIG. 2); and rotating, by the Raman laser system 207 of the LPAI-ACC 203, at least one Raman pulse around the determined axis by the determined angle of rotation $\theta_1$ in the determined direction of rotation 1201 (see FIG. 12). In some embodiments, the Raman laser system 207 may use optical plates, mirrors, piezo tip-tilt stages, acousto-optic deflectors, electro-optic modulators, combinations thereof, or the like to rotate at least one Raman pulse.

In some embodiments when the platform 103 of the hybrid INS 101 is mounted to the vehicle 105 using the gimbal mount 107 (see FIG. 1B), step 1307 of the FF method 1300 includes generating, by the PS 215, a control signal $S_1$ based on the determined axis, the determined direction of rotation 1201, and the determined angle of rotation $\theta_1$ (see FIG. 12); transferring, by the PS 215, the control signal $S_1$ to the gimbal mount 107 (see FIG. 1B); and rotating, by the gimbal mount 107, the platform 103 with the Raman laser system 207 placed on the platform 103, such that at least one Raman pulse is rotated around the determined axis by the determined angle of rotation $\theta_1$ in the determined direction of rotation 1201 (see FIG. 12) due to rotation of the gimbal mount 107. In some embodiments, a control system (not illustrated) of the gimbal mount 107 is used to rotate the platform 103 with the Raman laser system 207 placed on the platform 103.

Referring back to FIGS. 1A, 2 and 4, in some embodiments when the platform 103 of the hybrid INS 101 is directly mounted to the vehicle 105, on-axis acceleration effects on the LPAI-ACC 400 may be corrected using the FF method 800 described above with reference to FIG. 8. In some embodiments when the platform 103 of the hybrid INS 101 is directly mounted to the vehicle 105, cross-axis acceleration effects on the LPAI-ACC 400 may be corrected by performing the FF methods 1000 and/or 1100 described above with reference to FIGS. 10 and 11, respectively. In some embodiments when the platform 103 of the hybrid INS 101 is directly mounted to the vehicle 105, cross-axis rotation effects on the LPAI-ACC 400 may be corrected by performing the FF method 1300 described above with reference to FIG. 13.

Referring back to FIGS. 1B, 2 and 4, in some embodiments when the platform 103 of the hybrid INS 101 is mounted to the vehicle 105 using the gimbal mount 107, on-axis acceleration effects on the LPAI-ACC 400 may be corrected using the FF method 800 described above with reference to FIG. 8. In some embodiments when the platform 103 of the hybrid INS 101 is mounted to the vehicle 105 using the gimbal mount 107, cross-axis acceleration effects on the LPAI-ACC 400 may be corrected by performing the FF methods 1000 and/or 1100 described above with reference to FIGS. 10 and 11, respectively. In some embodiments when the platform 103 of the hybrid INS 101 is mounted to the vehicle 105 using the gimbal mount 107, cross-axis rotation effects on the LPAI-ACC 400 may be corrected by performing the FF method 1300 described above with reference to FIG. 13.

Referring back to FIGS. 2 and 4, in addition to correcting for the on-axis acceleration, cross-axis acceleration, and cross-axis rotation effects, the PS 215 may also be configured to correct for the wavefront (spatial) aberration for the Raman laser beams 411 and 413. Due to the wavefront aberration, atoms in the atomic cloud 403 experience an inhomogeneous wavefront, which limits light-pulse atom interferometry operations. In some embodiments, the wavefront aberration may be caused by defects or stress in various optical elements of the LPAI-ACC 400 that are used to manipulate, shape, steer, and rotate the Raman laser beams 411 and 413. The stress in various optical elements of the LPAI-ACC 400 may be caused by time-varying linear/angular velocities experienced by the LPAI-ACC 400. In some embodiments, the wavefront aberration may be detected with a CCD camera (not shown) and processed by the PS 215. Subsequently, the PS 215 sends a control signal to, for example, a deformable mirror (not shown) to correct for the wavefront aberration of the Raman laser beams 411 and 413.

Referring back to FIGS. 1A, 1, 2, and 4, the PS 215 and the conventional IMU 201 may also be configured to perform a vibration noise cancellation. In some embodiments, transfer functions of the vehicle 105, the platform 103, and the LPAI sensors 203 and 209 are determined through the characterization of mechanical vibration response. The conventional IMU 201 (with a pre-determined transfer function) determines the vibration noise characteristics (such as, for example, amplitude and frequency). Subsequently, the PS 215 filters the vibration noise from the interferometry signals based on the transfer functions and the determined vibration noise characteristics.

Figure 14:
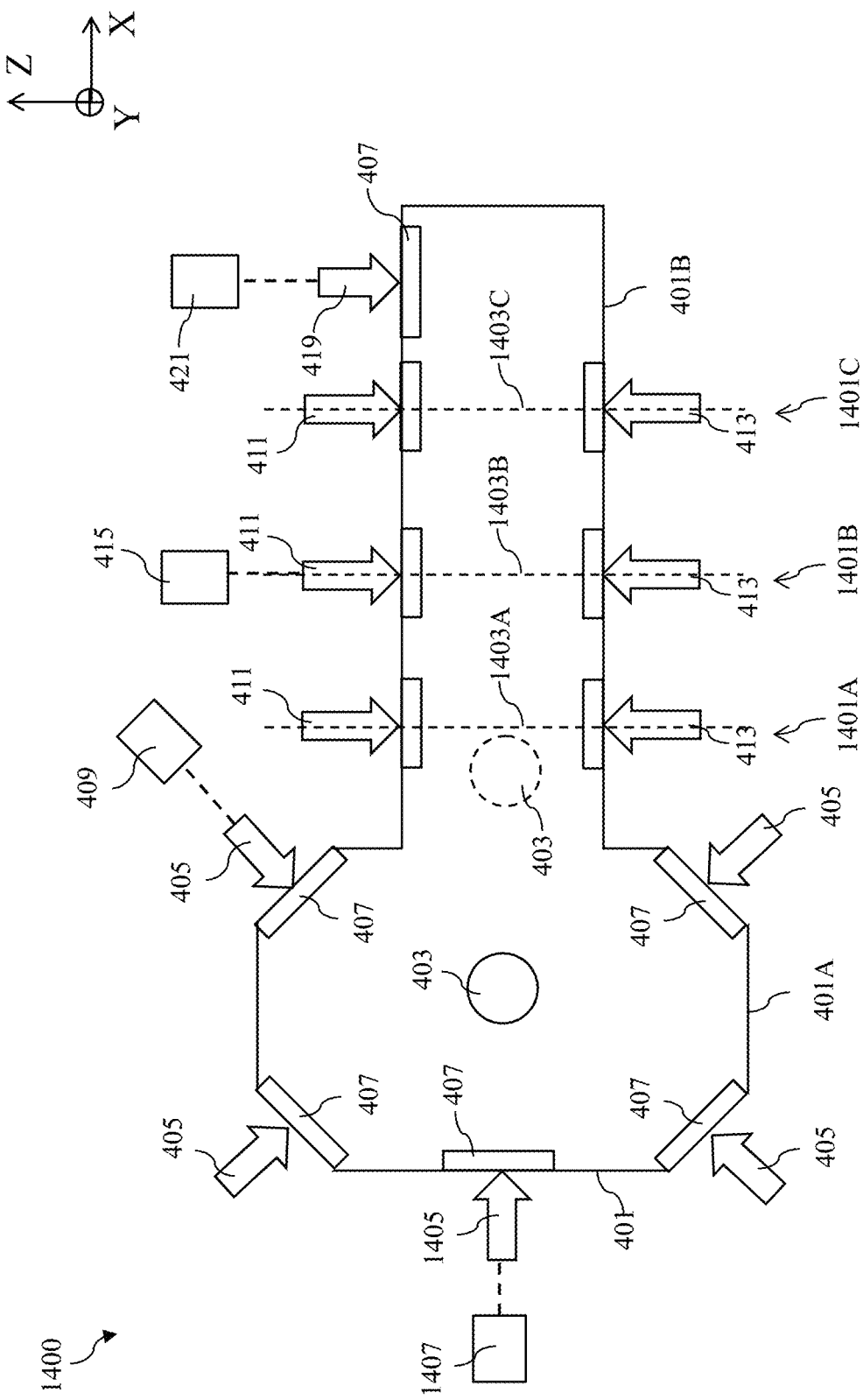
FIG. 14 illustrates an LPAI gyroscope in accordance with some embodiments.

FIG. 14 illustrates a light-pulse atom interferometer (LPAI) gyroscope, i.e., an LPAI-GYRO, 1400 in accordance with some embodiments. In the illustrated embodiment, the LPAI-GYRO 1400 is configured to measure angular velocity along Y axis. In other embodiments, the LPAI-GYRO 1400 may be configured to measure angular velocities along X and Z axes. Three orthogonal gyroscopes (measuring angular velocities along X, Y, and Z axes), such as the LPAI-GYRO 1400, may be implemented as the LPAI-GYRO 209 of the hybrid INS 101 illustrated in FIG. 2.

In some embodiments, the structure of the LPAI-GYRO 1400 is similar to the structure of LPAI-ACC 400 illustrated in FIG. 4, with similar features being labeled by similar numerical references, and descriptions of the similar features are not repeated herein. The LPAI-GYRO 1400 comprises three Raman laser beam pairs 1401A, 1401B, and 1401C that are fiber coupled to the vacuum chamber 401, such that each of the three Raman laser beam pairs 1401A, 1401B, and 1401C comprises counter-propagating Raman laser beams 411 and 413. The Raman laser beam pairs 1401A, 1401B, and 1401C are spaced apart from each other along X axis. In some embodiments, a distance between the Raman laser beam pair 1401A and the Raman laser beam pair 1401B is same as a distance between the Raman laser beam pair 1401B and the Raman laser beam pair 1401C. In other embodiments, the distance between the Raman laser beam pair 1401A and the Raman laser beam pair 1401B is different from the distance between the Raman laser beam pair 1401B and the Raman laser beam pair 1401C. The Raman laser beam pairs 1401A, 1401B, and 1401C have corresponding sensing axes 1403A, 1403B, and 1403C, respectively. The sensing axes 1403A, 1403B, and 1403C are parallel to Z axis.

The LPAI-GYRO 1400 further comprises a launching laser beam 1405 that is coupled to the vacuum chamber 401 and that is configured to launch the atomic cloud 403 along the second region 401B of the vacuum chamber 401 after the atomic cloud 403 is released from the MOT. In some embodiments, the launching laser beam 1405 is fiber coupled to the vacuum chamber 401 through a transparent window 407. In some embodiments, the launching laser beam 1405 is generated by a laser apparatus 1407. During the operation of the LPAI-GYRO 1400, the atomic cloud 403 (illustrated by the dashed circle) is released from the MOT, the launching laser beam 1405 is applied to the atomic cloud 403 and the atomic cloud 403 propagates along the second region 401B of the vacuum chamber 401. Subsequently a sequence of Raman pulses from the Raman laser beam pairs 1401A, 1401B, and 1401C are applied to the atomic cloud 403 to perform light-pulse atom interferometry operations.

Figure 15:
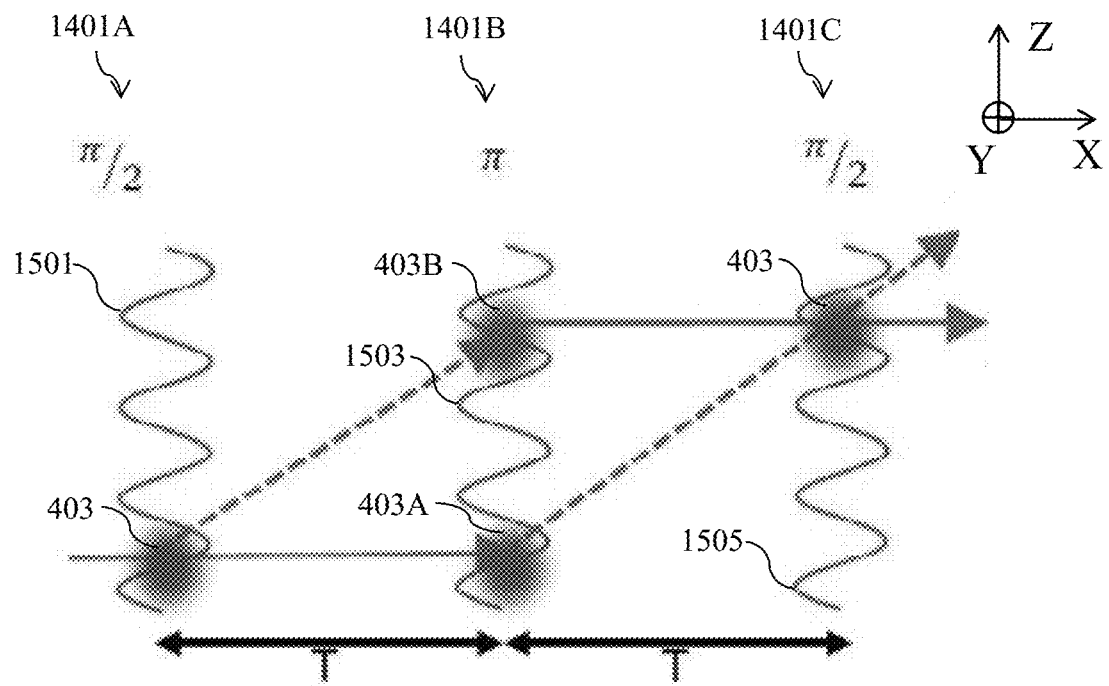
FIG. 15 illustrates a schematic of operations performed on an atomic cloud during operating an LPAI gyroscope in accordance with some embodiments.

FIG. 15 illustrates a schematic of operations performed on the atomic cloud 403 during operation of the LPAI-GYRO 1400 (see FIG. 14) in accordance with some embodiments. In some embodiments, after trapping and cooling the atomic cloud 403 (illustrated by the solid circle in FIG. 14) in the MOT, the MOT is turned off and atomic cloud 403 (illustrated by the dashed circle in FIG. 14) is released. After releasing the atomic cloud 403, the launching laser beam 1405 is applied to the atomic cloud 403, which launches the atomic cloud 403 along the second region 401B of the vacuum chamber. The atomic cloud 403 is then subject to inertial forces such as accelerations and rotations in all three dimensions and is allowed to move in all three dimensions. Accordingly, the LPAI-GYRO 1400 may be also referred to as a free-space LPAI-GYRO 1400.

Subsequently, a sequence of Raman pulses is applied to the atomic cloud 403. In some embodiments, the sequence of Raman pulses comprises three Raman pulses 1501, 1503, and 1505, which split, redirect, and re-combine an atomic wavepacket of the atomic cloud 403, respectively. The Raman pulses 1501, 1503, and 1505 propagate along the sensing axes 1403A, 1403B, and 1403C, respectively. Furthermore, atoms of the atomic cloud 403 enclose an area in space (such as the Sagnac area) while propagating through the second region 401B of the vacuum chamber 401 during the application of the Raman pulses 1501, 1503, and 1505 to the atomic cloud 403. The first Raman pulse 1501 is a π/2-pulse, the second Raman pulse 1503 is a π-pulse, and the third Raman pulse 1505 is a π/2-pulse. The Raman pulses 1501, 1503, and 1505 are applied to the atomic cloud 403 in a similar manner as the Raman pulses 601, 603, 605, respectively, as described above with reference to FIG. 6, and the description is not repeated herein. In contrast with the Raman pulses 601, 603, and 605, the Raman pulses 1501, 1503, and 1505 are spaced apart not only in time, but also in space. The Raman pulses 1501, 1503, and 1505 correspond to the Raman beam pairs 1401A, 1401B, and 1401C, respectively.

After applying the Raman pulses 1501, 1503, and 1505, atomic states of atoms in the atomic cloud 403 are detected using the probing laser beam 419 (see FIG. 14) and the probability $Pg_2$ of atoms being in the state $|g_2\rangle$ (see FIG. 5) is measured. In some embodiments, atomic states may be detected using a fluorescence detection, an absorption detection, or the like. The value of angular velocity $\Omega$ is encoded in the probability $Pg_2=\frac{1}{2}(1-\cos\Delta\phi)$, where $\Delta\phi=k_{\mathit{eff}}\cdot2(v\times\Omega)T^2$, and where v is an initial velocity of atoms in the atomic cloud 403. Accordingly, the value of angular velocity $\Omega$ is measured by detecting atomic fringes.

Referring back to FIG. 14, as described below in greater detail, performance of the LPAI-GYRO 1400 is affected by various dynamic phenomena. In some embodiments when the LPAI-GYRO 1400 is implemented as the LPAI-GYRO 209 of the hybrid INS 101, motion of the platform 103 (see FIGS. 1A and 1B) of the hybrid INS 101 affects performance of the LPAI-GYRO 1400. The various dynamic phenomena may include on-axis accelerations and rotations (such as accelerations and rotations along the sensing axes 1403A, 1403B, and 1403C) and cross-axis accelerations and rotations (such as accelerations and rotations perpendicular to the sensing axes 1403A, 1403B, and 1403C) caused by motion of the platform 103.

Figure 16:
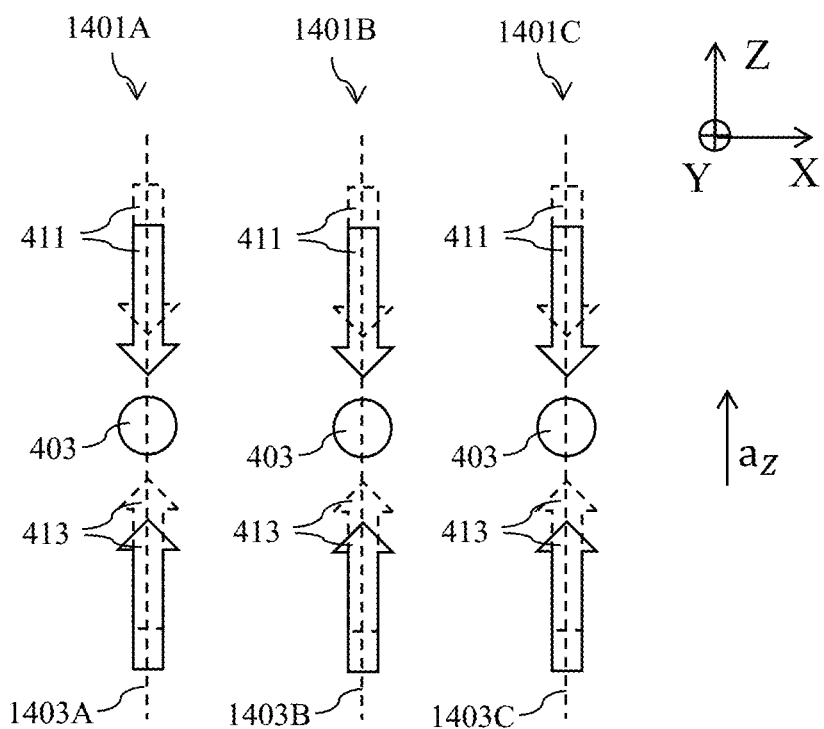
FIG. 16 illustrates a dynamic phenomenon affecting the performance of an LPAI gyroscope in accordance with some embodiments.

FIG. 16 illustrates a dynamic phenomenon affecting the performance of the LPAI-GYRO 1400 (see FIG. 14) in accordance with some embodiments. In some embodiments when the LPAI-GYRO 1400 is implemented as the LPAI-GYRO 209 of the hybrid INS 101 (see FIG. 2), on-axis acceleration $a_Z$ of the platform 103 (see FIGS. 1A and 1B) on which the hybrid INS 101 is placed causes translation of the Raman laser beam pairs 1401A, 1401B, and 1401C (illustrated by the dashed arrows) along the sensing axes 1403A, 1403B, and 1403C. This results in Doppler-shifted Raman laser beams 411 and 413 and chirped light-pulse atom interferometry fringes, which limits the performance of light-pulse atom interferometry of the LPAI-GYRO 1400 (see FIG. 14). As described below in greater detail, an FF method is used to correct for on-axis acceleration effects.

Figure 17:
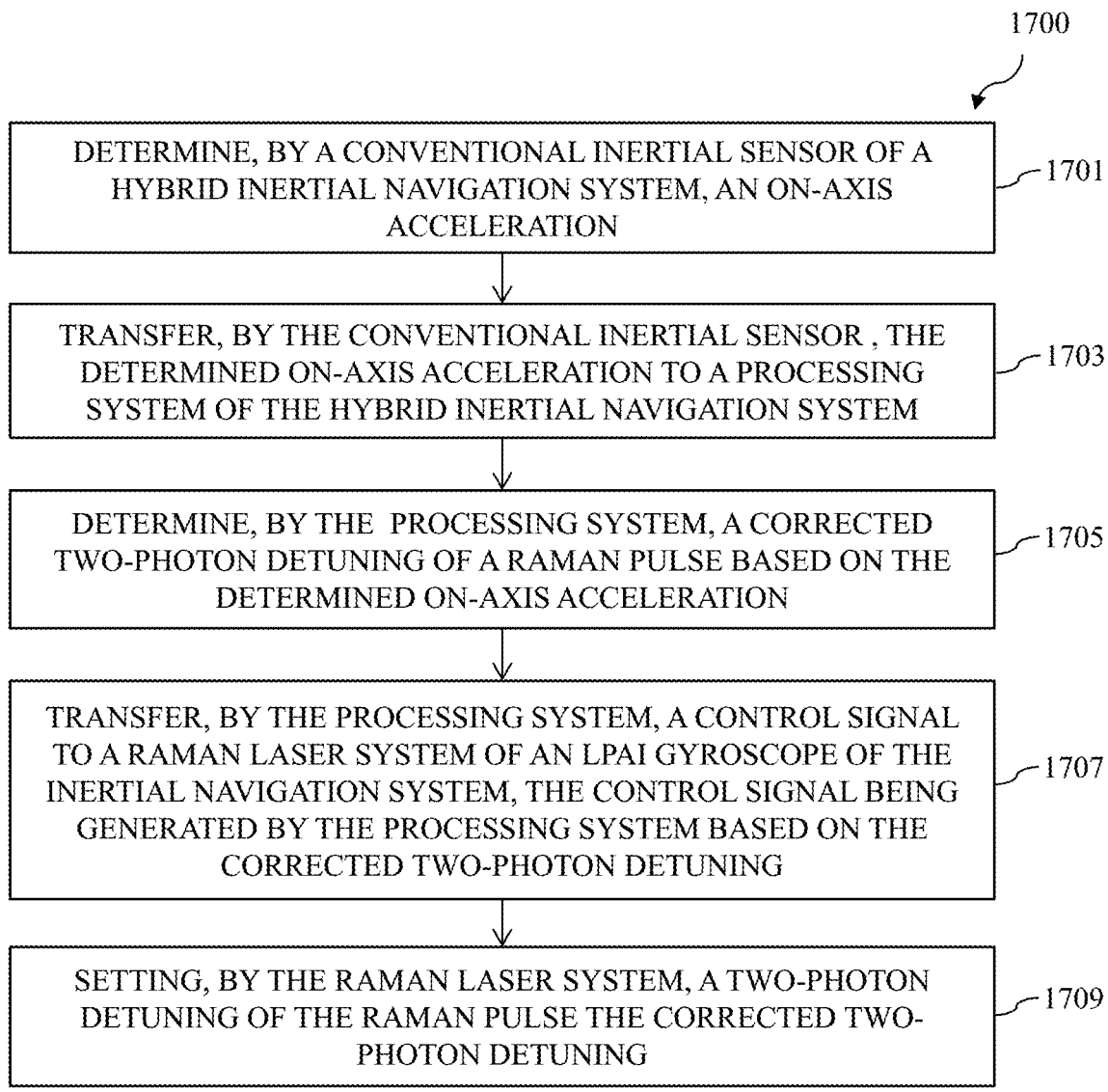
FIG. 17 is a flow diagram illustrating a feedforward method for correcting on-axis acceleration effects in accordance with some embodiments.

FIG. 17 is a flow diagram illustrating an FF method 1700 for correcting on-axis acceleration effects in accordance with some embodiments. In some embodiments when the LPAI-GYRO 1400 (see FIG. 14) is implemented as the LPAI-GYRO 209 of the hybrid INS 101 (see FIG. 2), the PS 215 and the conventional IMU 201 of the hybrid INS 101 are used to perform steps of the FF method 1700. As the feedforward correction operations (FF-COs) of FF method 1700 are applied to the LPAI-GYRO 209, the FF method 1700 may also be termed LPAI-GYRO FF-COs.

Referring to FIGS. 2 and 14-17, the FF method 1700 starts with step 1701, when the conventional IMU 201 of the hybrid INS 101 determines an on-axis acceleration $a_Z$. In step 1703, the conventional IMU 201 transfers the determined on-axis acceleration $a_Z$ to the PS 215 of the hybrid INS 101. In step 1705, the PS 215 estimates trajectories and internal states of atoms in the atomic cloud 403 using an LPAI physical model and determines a corrected two-photon detuning $\delta_{cor}$ of at least one Raman pulse based on the determined on-axis acceleration $a_Z$. The Raman pulse may be the first Raman pulse 1501, the second Raman pulse 1503, or the third Raman pulse 1505 (see FIG. 15). In some embodiments, the corrected two-photon detuning $\delta_{cor}$ is determined according to equation $\delta_{cor}(t)=k_{\mathit{eff}}\cdot a_Z t$, where t is time. Since the Raman pulses 1501, 1503, and 1505 are spaced apart both in space and time, the determined corrected two-photon detuning $\delta_{cor}$ may be different for different ones of the Raman pulses 1501, 1503, and 1505. In step 1707, the PS 215 generates a control signal $S_2$ based on the corrected two-photon detuning $\delta_{cor}$ and transfers the control signal $S_2$ to the Raman laser system 213 of the LPAI-GYRO 209 of the hybrid INS 101. In step 1709, the Raman laser system 213 of the LPAI-GYRO 209 sets the two-photon detuning δ (see FIG. 5) of the Raman beam to the corrected two-photon detuning $δ_{cor}$. In some embodiments, the FF method 1700 is performed before applying the at least one Raman pulse to the atomic cloud 403. In other embodiments, the FF method 1700 is performed while applying the at least one Raman pulse to the atomic cloud 403.

Figure 18:
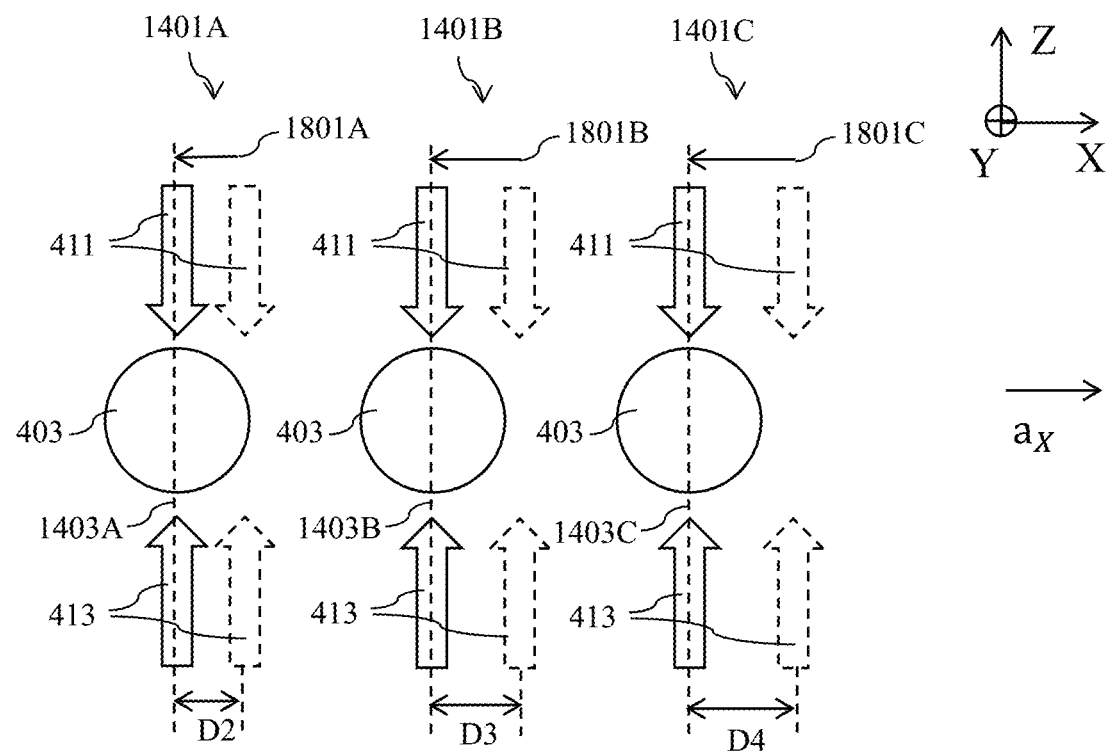
FIG. 18 illustrates a dynamic phenomenon affecting the performance of an LPAI gyroscope in accordance with some embodiments.

FIG. 18 illustrates a dynamic phenomenon affecting the performance of the LPAI-GYRO 1400 (see FIG. 14) in accordance with some embodiments. In some embodiments when the LPAI-GYRO 1400 (see FIG. 14) is implemented as the LPAI-GYRO 209 of the hybrid INS 101 (see FIG. 2), cross-axis acceleration $a_X$ of the platform 103 (see FIGS. 1A and 1B) on which the hybrid INS 101 is placed causes translation or shift of the Raman laser beam pairs 1401A, 1401B, and 1401C (illustrated by the dashed arrows) perpendicular to the sensing axes 1403A, 1403B, and 1403C, respectively. In some embodiments, the Raman laser beam pair 1401A is shifted in a direction of the cross-axis acceleration $a_X$ by a distance D2, the Raman laser beam pair 1401B is shifted in the direction of the cross-axis acceleration $a_X$ by a distance D3, and the Raman laser beam pair 1401C is shifted in the direction of the cross-axis acceleration $a_X$ by a distance D4. In some embodiments, the distances D2, D3, and D4 may equal each other. In other embodiments, the distances D2, D3, and D4 may be different from each other. Cross-axis acceleration degrades the overlap between the atomic cloud 403 and intensity profiles of the Raman laser beam pairs 1401A, 1401B, and 1401C, which results in reduced fringe visible of the interferometry signal. As described below in greater detail, an FF method is used to correct for cross-axis acceleration effects.

Figure 19:
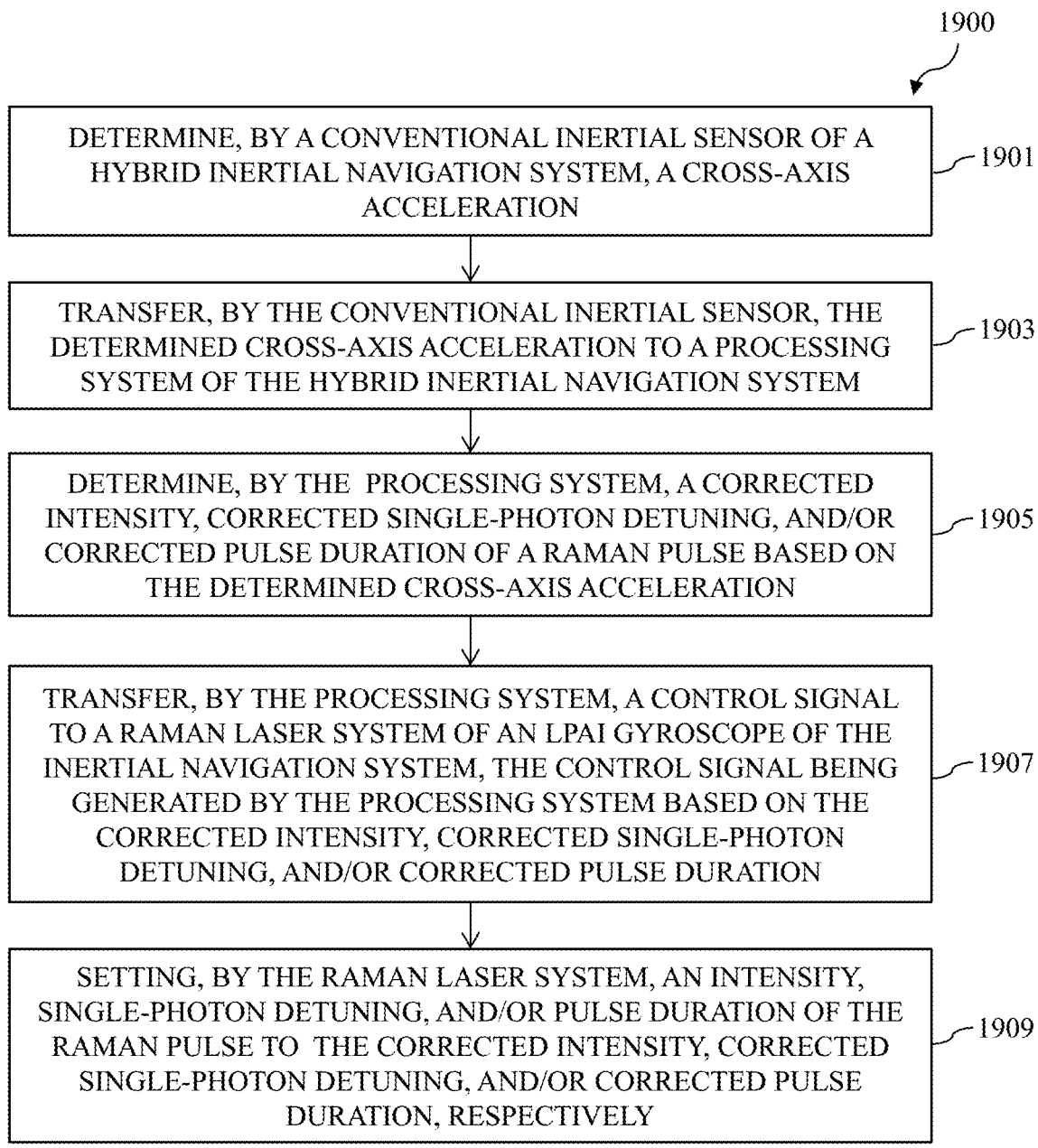
FIG. 19 is a flow diagram illustrating a feedforward method for correcting cross-axis acceleration effects in accordance with some embodiments.

FIG. 19 is a flow diagram illustrating an FF method 1900 for correcting cross-axis acceleration effects in accordance with some embodiments. In some embodiments when the LPAI-GYRO 1400 (see FIG. 14) is implemented as the LPAI-GYRO 209 of the hybrid INS 101 (see FIG. 2), the PS 215 and the conventional IMU 201 of the hybrid INS 101 are used to perform steps of the FF method 1900. As the feedforward correction operations (FF-COs) of FF method 1900 are applied to the LPAI-GYRO 209, the FF method 1900 may also be termed LPAI-GYRO FF-COs.

Referring to FIGS. 2, 14, 18, and 19, the FF method 1900 starts with step 1901, when the conventional IMU 201 of the hybrid INS 101 determines a cross-axis acceleration $a_X$. In step 1903, the conventional IMU 201 transfers the determined cross-axis acceleration $a_X$ to the PS 215 of the hybrid INS 101. In step 1905, the PS 215 estimates trajectories and internal states of atoms in the atomic cloud 403 using an LPAI physical model and determines a corrected intensity (or a corrected amplitude), corrected single-photon detuning Δcor, and/or corrected pulse duration of at least one Raman pulse based on the determined cross-axis acceleration $a_X$. The Raman pulse may be the first Raman pulse 1501, the second Raman pulse 1503, or the third Raman pulse 1505 (see FIG. 15). In step 1907, the PS 215 generates a control signal $S_2$ based on the corrected intensity (or the corrected amplitude), corrected single-photon detuning Δcor, and/or corrected pulse duration of the at least one Raman pulse and transfers the control signal $S_2$ to the Raman laser system 213 of the LPAI-GYRO 209 of the hybrid INS 101. In step 1909, the Raman laser system 213 of the LPAI-GYRO 209 sets an intensity (or an amplitude), single-photon detuning Δ (see FIG. 5), and/or pulse duration of the at least one Raman pulse to the corrected intensity (or the corrected amplitude), corrected single-photon detuning Δcor, and/or corrected pulse duration, respectively. In some embodiments, the FF method 1900 is performed before applying the at least one Raman pulse to the atomic cloud 403. In other embodiments, the FF method 1900 is performed while applying the at least one Raman pulse to the atomic cloud 403.

In some embodiments, step 1905 comprises determining a corrected amplitude A(t) according to equation $A(t)=F(|r_c(t)|)A_0$, where $|r_c(t)|$ is a lateral displacement of atoms in the atomic cloud 403 (see FIG. 14) with respect to a corresponding one of the shifted Raman laser beam pairs 1401A, 1401B, and 1401C, the function F is an amplitude increase factor, and $A_0$ is the nominal Raman laser amplitude suitable for the case where the center of the atom cloud 403 coincides with the Raman laser beam center. In some embodiments, the amplitude increase factor F as a function of the lateral displacement $|r_c(t)|$, a size of the atomic cloud 403, and a width of the Raman beams is determined using a simulation such as, for example, a Monte Carlo simulation. In some embodiments, the lateral displacement $|r_c(t)|$ is determined from the determined cross-axis acceleration $a_X$ using suitable kinematic equations. For increasing the FF processing efficiency, in some embodiments, the simulation results of the corrected amplitude A(t) for various dynamic scenarios may be prepared as lookup tables in a memory of the PS 215 or be pre-trained in deep neural networks of the PS 215.

Figure 20:
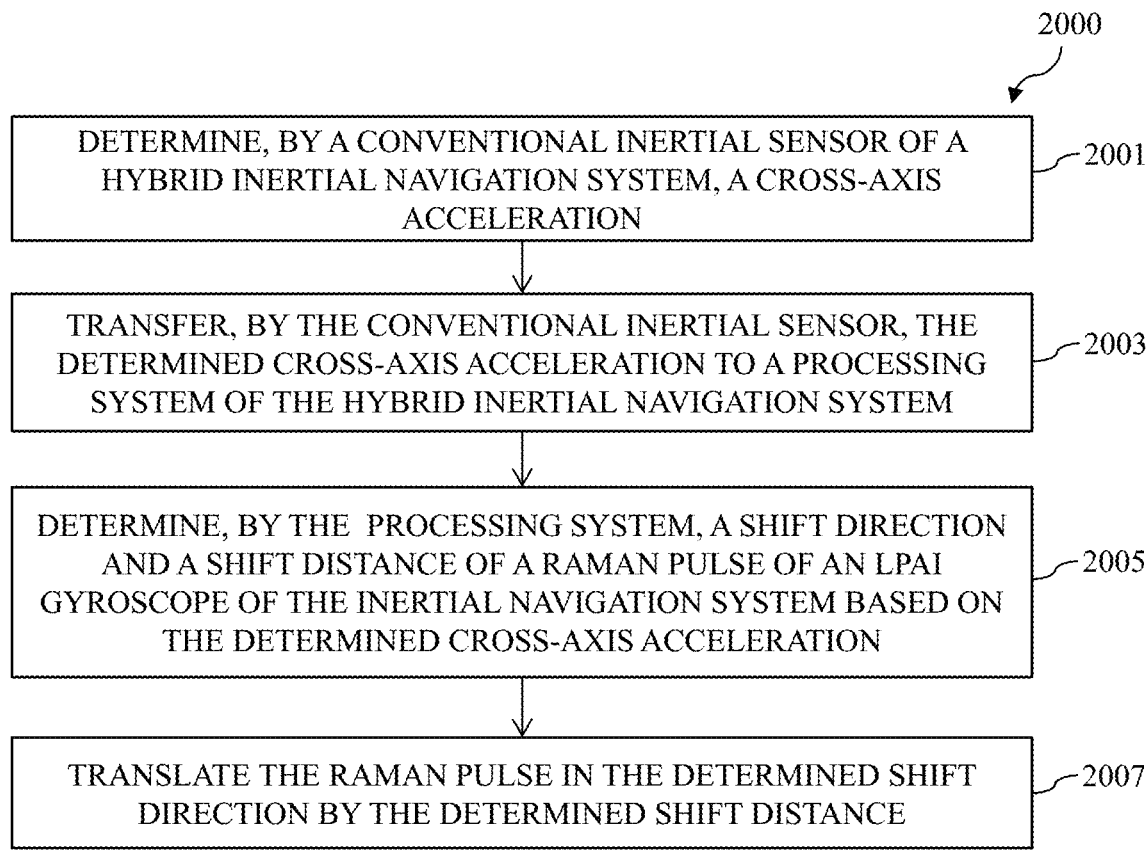
FIG. 20 is a flow diagram illustrating a feedforward method for correcting cross-axis acceleration effects in accordance with some embodiments.

FIG. 20 is a flow diagram illustrating an FF method 2000 for correcting cross-axis acceleration effects in accordance with some embodiments. In some embodiments when the LPAI-GYRO 1400 (see FIG. 14) is implemented as the LPAI-GYRO 209 of the hybrid INS 101 (see FIG. 2), the PS 215 and the conventional IMU 201 of the hybrid INS 101 are used to perform steps of the FF method 2000. As the feedforward correction operations (FF-COs) of FF method 2000 are applied to the LPAI-GYRO 209, the FF method 2000 may also be termed LPAI-GYRO FF-COs.

Referring to FIGS. 2, 14, 18, and 20, the FF method 2000 starts with step 2001, when the conventional IMU 201 of the hybrid INS 101 determines a cross-axis acceleration $a_X$. In step 2003, the conventional IMU 201 transfers the determined cross-axis acceleration $a_X$ to the PS 215 of the hybrid INS 101. In step 2005, the PS 215 determines a shift direction and a shift distance of at least one Raman pulse of an LPAI-GYRO 209 of the hybrid INS 101 based on the determined cross-axis acceleration $a_X$. The Raman pulse may be the first Raman pulse 1501, the second Raman pulse 1503, or the third Raman pulse 1505 (see FIG. 15). In some embodiments, the PS 215 determines the shift direction as opposite to a direction of the determined cross-axis acceleration $a_X$. In some embodiments, the PS 215 determines the shift distance based on the determined cross-axis acceleration $a_X$ by employing suitable kinematic equations, while the phase lock of the Raman laser beams 411 and 413 is maintained. For example, the shift distance may be determined by time-integrating the determined cross-axis acceleration $a_X$. In step 2007, the at least one Raman pulse is translated in the determined shift direction by the determined shift distance. In some embodiments, the FF method 2000 is performed before applying the at least one Raman pulse to the atomic cloud 403. In other embodiments, the FF method 2000 is performed while applying the at least one Raman pulse to the atomic cloud 403.

In some embodiments when the at least one Raman pulse is the first Raman pulse 1501 (corresponding to the Raman laser beam pair 1401A), the determined shift direction is a direction 1801A and the determined shift distance equals a distance D2 as illustrated in FIG. 18. In some embodiments when the at least one Raman pulse is the second Raman pulse 1503 (corresponding to the Raman laser beam pair 1401B), the determined shift direction is a direction 1801B and the determined shift distance equals a distance D3 as illustrated in FIG. 18. In some embodiments when the at least one Raman pulse is the third Raman pulse 1505 (corresponding to the Raman laser beam pair 1401C), the determined shift direction is a direction 1801C and the determined shift distance equals a distance D4 as illustrated in FIG. 18.

In some embodiments when the platform 103 of the hybrid INS 101 is directly mounted on the vehicle 105 (see FIG. 1A), step 2007 of the FF method 2000 includes generating, by the PS 215, a control signal $S_2$ based on the determined shift direction and the determined shift distance; transferring, by the PS 215, the control signal $S_2$ to the Raman laser system 213 of the LPAI-GYRO 209 of the hybrid INS 101; and translating, by the Raman laser system 213 of the LPAI gyroscope 209, the at least one Raman pulse in the determined shift direction by the determined shift distance. In some embodiments, the Raman laser system 213 may use optical plates, mirrors, piezo tip-tilt stages, acousto-optic deflectors, electro-optic modulators, combinations thereof, or the like to translate the at least one Raman pulse.

In some embodiments when the platform 103 of the hybrid INS 101 is mounted on the vehicle 105 using the gimbal mount 107 (see FIG. 1B), step 2007 of the FF method 2000 includes generating, by the PS 215, a control signal $S_2$ based on the determined shift direction and the determined shift distance; transferring, by the PS 215, the control signal $S_2$ to the gimbal mount 107 (see FIG. 1B); and translating, by the gimbal mount 107, the platform 103 with the Raman laser system 213 placed on the platform 103, such that the at least one Raman pulse is translated in the determined shift direction by the determined shift distance, due to translation of the gimbal mount 107. In some embodiments, a control system (not illustrated) of the gimbal mount 107 is used to translate the platform 103 with the Raman laser system 207 placed on the platform 103.

Figure 21:
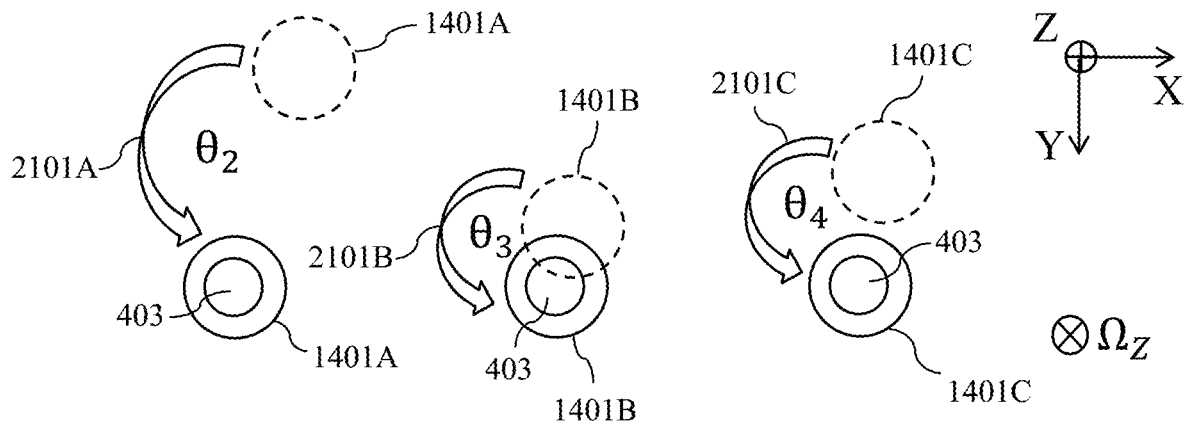
FIG. 21 illustrates a dynamic phenomenon affecting the performance of an LPAI gyroscope in accordance with some embodiments.

FIG. 21 illustrates a dynamic phenomenon affecting the performance of the LPAI-GYRO 1400 (see FIG. 14) in accordance with some embodiments. In some embodiments when the LPAI-GYRO 1400 is implemented as the LPAI-GYRO 209 of the hybrid INS 101 (see FIG. 2), on-axis rotation with on-axis angular velocity $\Omega_Z$ of the platform 103 (see FIGS. 1A and 1B) on which the hybrid INS 101 is placed causes rotation of the Raman laser beam pairs 1401A, 1401B, and 1401C (illustrated by the dashed arrows) with respect to the sensing axes 1403A, 1403B, and 1403C, respectively. In some embodiments, the Raman laser beam pair 1401A is rotated with respect to the sensing axes 1403A by an angle $\theta_2$ around an axis defined by the on-axis angular velocity $\Omega_Z$. In some embodiments, the Raman laser beam pair 1401B is rotated with respect to the sensing axes 1403B by an angle $\theta_3$ around the axis defined by the on-axis angular velocity $\Omega_Z$. In some embodiments, the Raman laser beam pair 1401C is rotated with respect to the sensing axes 1403C by an angle $\theta_4$ around the axis defined by the on-axis angular velocity $\Omega_Z$. In some embodiments, the angles $\theta_2$, $\theta_3$, and $\theta_4$ may equal each other. In other embodiments, the angles $\theta_2$, $\theta_3$, and $\theta_4$ may be different from each other. On-axis rotations induce contrast loss of the light-pulse atom interferometry signal by, for example, degrading the overlap between split atomic clouds 403A and 403B (see FIG. 15). As described below in greater detail, an FF method is used to correct for on-axis rotation effects.

Figure 22:
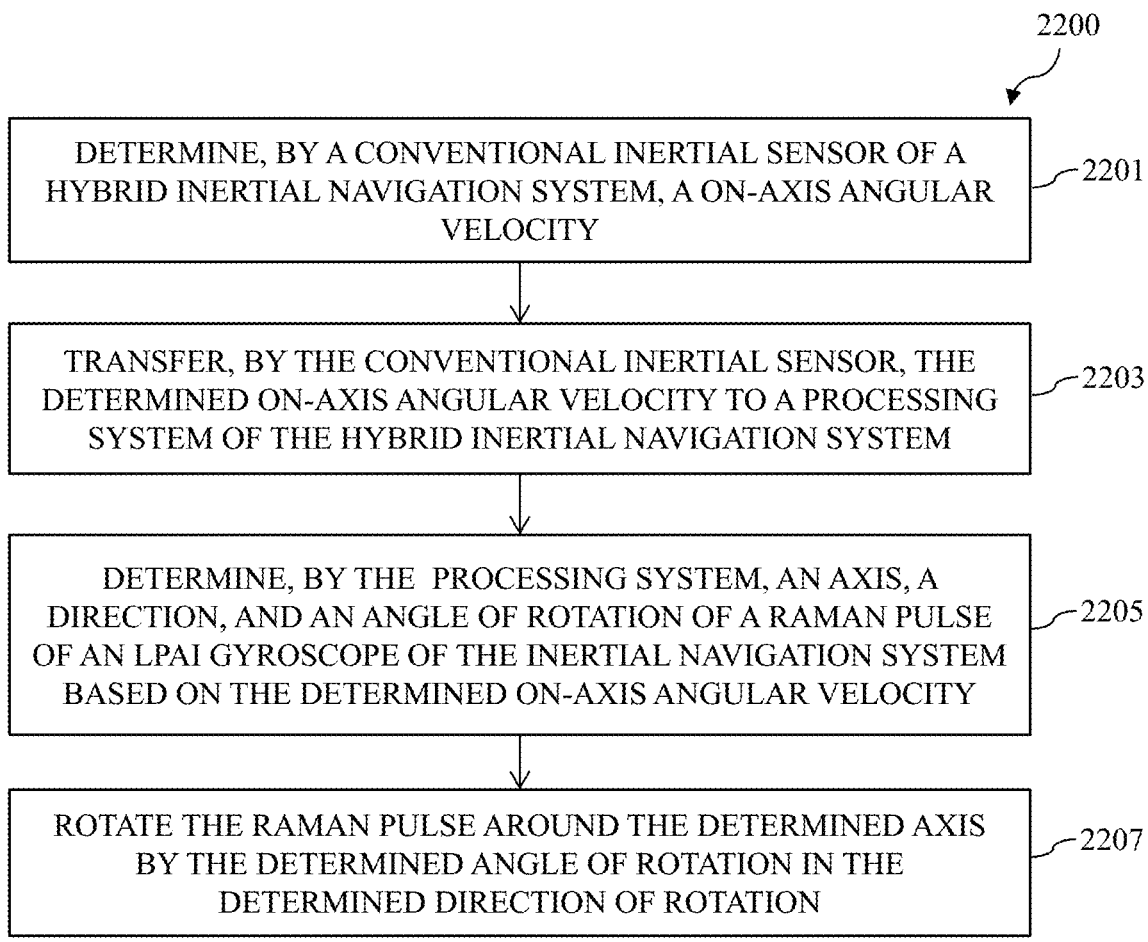
FIG. 22 is a flow diagram illustrating a feedforward method for correcting on-axis rotation effects in accordance with some embodiments.

FIG. 22 is a flow diagram illustrating an FF method 2200 for correcting on-axis rotation effects in accordance with some embodiments. In some embodiments when the LPAI-GYRO 1400 (see FIG. 14) is implemented as the LPAI-GYRO 209 of the hybrid INS 101 (see FIG. 2), the PS 215 and the conventional IMU 201 of the hybrid INS 101 are used to perform steps of the FF method 2200. As the feedforward correction operations (FF-COs) of FF method 2200 are applied to the LPAI-GYRO 209, the FF method 2200 may also be termed LPAI-GYRO FF-COs.

Referring to FIGS. 2, 14, 21, and 22, the FF method 2200 starts with step 2201, when the conventional IMU 201 of the hybrid INS 101 determines an on-axis angular velocity $\Omega_Z$. In step 2203, the conventional IMU 201 transfers the determined on-axis angular velocity $\Omega_Z$ to the PS 215 of the hybrid INS 101. In step 2205, the PS 215 determines an axis, a direction, and an angle of rotation of at least one Raman pulse of the LPAI-GYRO 209 of the hybrid INS 101 based on the determined cross-axis angular velocity $\Omega_Z$. The Raman pulse may be the first Raman pulse 1501, the second Raman pulse 1503, or the third Raman pulse 1505 (see FIG. 15). In step 2207, the at least one Raman pulse is rotated around the determined axis of rotation by the determined angle of rotation in the determined direction of rotation. In some embodiments, the FF method 2200 is performed before applying the at least one Raman pulse to the atomic cloud 403. In other embodiments, the feedforward method 2200 is performed while applying the at least one Raman pulse to the atomic cloud 403.

In some embodiments when the at least one Raman pulse is the first Raman pulse 1501 (corresponding to the Raman laser beam pair 1401A), the determined axis of rotation is an axis of rotation defined by the on-axis angular velocity $\Omega_Z$, the determined direction of rotation is a direction 2101A, which is opposite to a direction of rotation defined by the on-axis angular velocity $\Omega_Z$, and the angle of rotation equals the angle $\theta_2$ as illustrated in FIG. 21. In some embodiments, the PS 215 determines the angle of rotation $\theta_2$ based on the determined on-axis angular velocity $\Omega_Z$ by employing suitable kinematic equations. For example, the angle of rotation $\theta_2$ may be determined by time-integrating the determined on-axis angular velocity $\Omega_Z$.

In some embodiments when the at least one Raman pulse is the second Raman pulse 1503 (corresponding to the Raman laser beam pair 1401B), the determined axis of rotation is an axis of rotation defined by the on-axis angular velocity $\Omega_Z$, the determined direction of rotation is a direction 2101B, which is opposite to the direction of rotation defined by the on-axis angular velocity $\Omega_Z$, and the angle of rotation equals the angle $\theta_3$ as illustrated in FIG. 21. In some embodiments, the PS 215 determines the angle of rotation $\theta_3$ based on the determined on-axis angular velocity $\Omega_Z$ by employing suitable kinematic equations. For example, the angle of rotation $\theta_3$ may be determined by time-integrating the determined on-axis angular velocity $\Omega_Z$.

In some embodiments when the at least one Raman pulse is the third Raman pulse 1505 (corresponding to the Raman laser beam pair 1401C), the determined axis of rotation is an axis of rotation defined by the on-axis angular velocity $\Omega_Z$, the determined direction of rotation is a direction 2101C, which is opposite to the direction of rotation defined by the on-axis angular velocity $\Omega_Z$, and the angle of rotation equals to the angle $\theta_4$ as illustrated in FIG. 21. In some embodiments, the PS 215 determines the angle of rotation $\theta_4$ based on the determined on-axis angular velocity $\Omega_Z$ by employing suitable kinematic equations. For example, the angle of rotation $\theta_4$ may be determined by time-integrating the determined on-axis angular velocity $\Omega_Z$.

In some embodiments when the platform 103 of the hybrid INS 101 is directly mounted on the vehicle 105 (see FIG. 1A), step 2207 of the FF method 2200 includes generating, by the PS 215, a control signal $S_2$ based on the determined axis, determined direction, and determined angle of rotation; transferring, by the PS 215, the control signal $S_2$ to the Raman laser system 213 of the LPAI-GYRO 209 of the hybrid INS 101 (see FIG. 2); and rotating, by the Raman laser system 213 of the LPAI-GYRO 209, the at least one Raman pulse around the determined axis by the determined angle of rotation in the determined direction of rotation. In some embodiments, the Raman laser system 213 may use optical plates, mirrors, piezo tip-tilt stages, acousto-optic deflectors, electro-optic modulators, combinations thereof, or the like to rotate the at least one Raman pulse.

In some embodiments when the platform 103 of the hybrid INS 101 is mounted on the vehicle 105 using the gimbal mount 107 (see FIG. 1), step 2207 of the FF method 2200 includes generating, by the PS 215, a control signal $S_2$ based on the determined axis, determined direction, and determined angle of rotation; transferring, by the PS 215, the control signal $S_2$ to the gimbal mount 107 (see FIG. 1B); and rotating, by the gimbal mount 107, the platform 103 with the Raman laser system 213 placed on the platform 103, such that the at least one Raman pulse is rotated around the determined axis by the determined angle of rotation in the determined direction of rotation, due to rotation of the gimbal mount 107. In some embodiments, a control system (not illustrated) of the gimbal mount 107 is used to rotate the platform 103 with the Raman laser system 213 placed on the platform 103.

Figure 23:
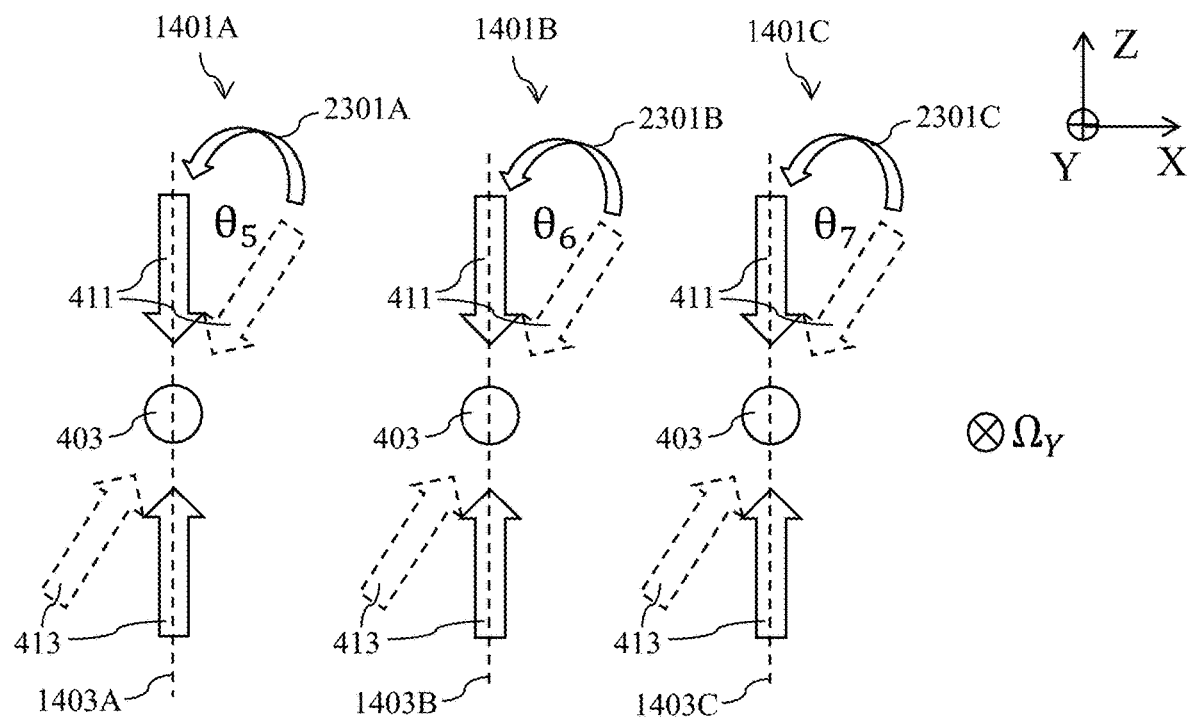
FIG. 23 illustrates a dynamic phenomenon affecting the performance of an LPAI gyroscope in accordance with some embodiments.

FIG. 23 illustrates a dynamic phenomenon affecting the performance of the LPAI-GYRO 1400 (see FIG. 14) in accordance with some embodiments. In some embodiments when the LPAI-GYRO 1400 is implemented as the LPAI-GYRO 209 of the hybrid INS 101 (see FIG. 2), cross-axis rotation with cross-axis angular velocity $\Omega_Y$ of the platform 103 (see FIGS. 1A and 1B) on which the hybrid INS 101 is placed causes rotation of the Raman laser beam pairs 1401A, 1401B, and 1401C (illustrated by the dashed arrows) with respect to the sensing axes 1403A, 1403B, and 1403C, respectively. In some embodiments, the Raman laser beam pair 1401A is rotated with respect to the sensing axes 1403A by an angle $\theta_5$ around an axis defined by the cross-axis angular velocity $\Omega_Y$. In some embodiments, the Raman laser beam pair 1401B is rotated with respect to the sensing axes 1403B by an angle $\theta_6$ around the axis defined by the cross-axis angular velocity $\Omega_Y$. In some embodiments, the Raman laser beam pair 1401C is rotated with respect to the sensing axes 1403C by an angle $\theta_7$ around the axis defined by the cross-axis angular velocity $\Omega_Y$. In some embodiments, the angles $\theta_5$, $\theta_6$, and $\theta_7$ may equal each other. In other embodiments, the angles $\theta_5$, $\theta_6$, and $\theta_7$ may be different from each other. Cross-axis rotations induce contrast loss of the light-pulse atom interferometry signal by, for example, degrading the overlap between split atomic clouds 403A and 403B (see FIG. 15). As described below in greater detail, an FF method is used to correct for cross-axis rotation effects.

Figure 24:
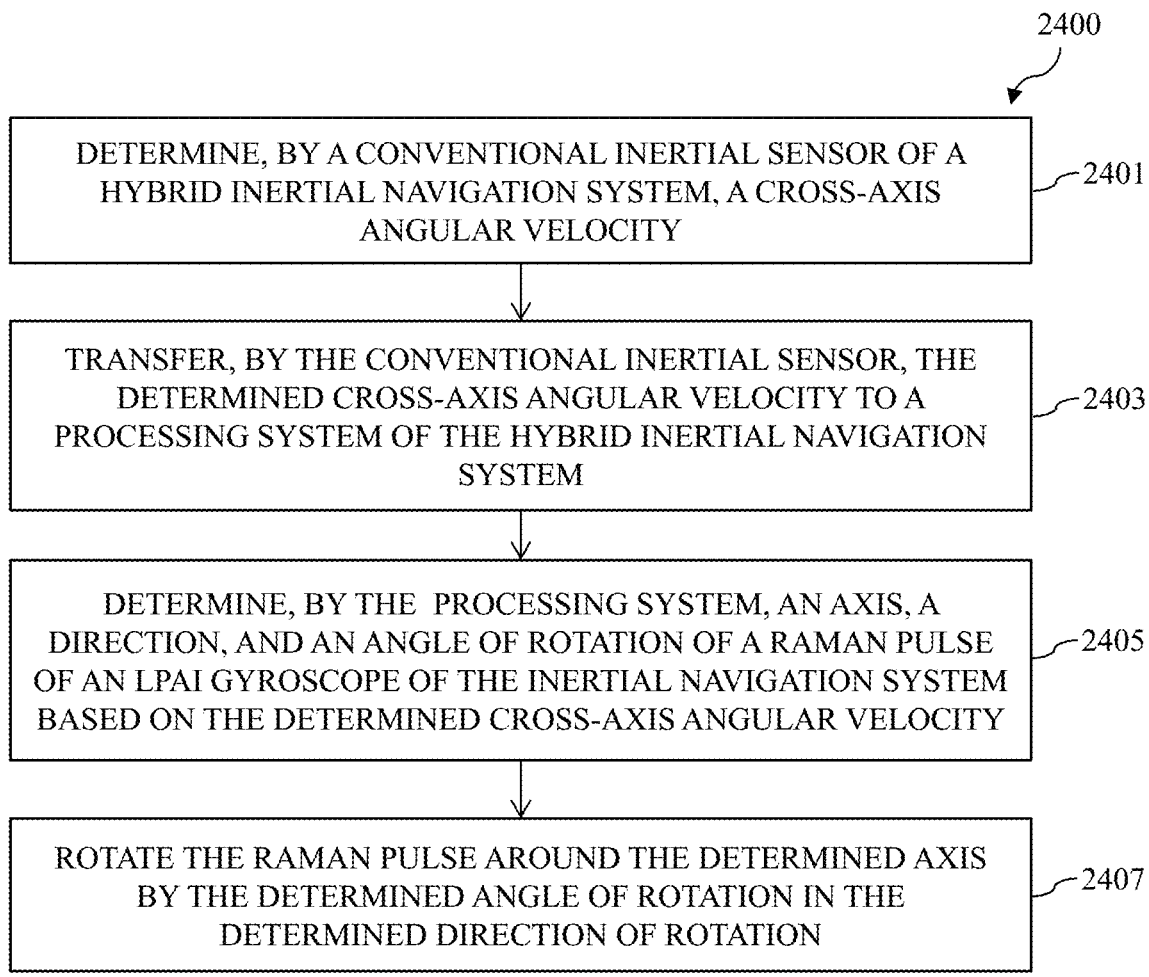
FIG. 24 is a flow diagram illustrating a feedforward method for correcting cross-axis rotation effects in accordance with some embodiments.

FIG. 24 is a flow diagram illustrating an FF method 2400 for correcting on-axis rotation effects in accordance with some embodiments. In some embodiments when the LPAI-GYRO 1400 (see FIG. 14) is implemented as the LPAI-GYRO 209 of the hybrid INS 101 (see FIG. 2), the PS 215 and the conventional IMU 201 of the hybrid INS 101 are used to perform steps of the FF method 2400. As the feedforward correction operations (FF-COs) of FF method 2400 are applied to the LPAI-GYRO 209, the FF method 2400 may also be termed LPAI-GYRO FF-COs.

Referring to FIGS. 2, 14, 23, and 24, the FF method 2400 starts with step 2401, when the conventional IMU 201 of the hybrid INS 101 determines a cross-axis angular velocity $\Omega_Y$. In step 2403, the conventional IMU 201 transfers the determined cross-axis angular velocity $\Omega_Y$ to the PS 215 of the hybrid INS 101. In step 2405, the PS 215 determines an axis, a direction, and an angle of rotation of at least one Raman pulse of the LPAI-GYRO 209 of the hybrid INS 101 based on the determined cross-axis angular velocity $\Omega_Y$. The Raman pulse may be the first Raman pulse 1501, the second Raman pulse 1503, or the third Raman pulse 1505 (see FIG. 15). In step 2407, the Raman pulse is rotated around the determined axis of rotation by the determined angle of rotation in the determined direction of rotation. In some embodiments, the FF method 2400 is performed before applying the at least one Raman pulse to the atomic cloud 403. In other embodiments, the FF method 2400 is performed while applying the at least one Raman pulse to the atomic cloud 403.

In some embodiments when the at least one Raman pulse is the first Raman pulse 1501 (corresponding to the Raman laser beam pair 1401A), the determined axis of rotation is an axis of rotation defined by the cross-axis angular velocity $\Omega_Y$, the determined direction of rotation is a direction 2301A, which is opposite to a direction of rotation defined by the cross-axis angular velocity $\Omega_Y$, and the angle of rotation equals to the angle $\theta_5$ as illustrated in FIG. 23. In some embodiments, the PS 215 determines the angle of rotation $\theta_5$ based on the determined cross-axis angular velocity $\Omega_Y$ by employing suitable kinematic equations. For example, the angle of rotation $\theta_5$ may be determined by time-integrating the determined cross-axis angular velocity $\Omega_Y$.

In some embodiments when the at least one Raman pulse is the second Raman pulse 1503 (corresponding to the Raman laser beam pair 1401B), the determined axis of rotation is the axis of rotation defined by the cross-axis angular velocity $\Omega_Y$, the determined direction of rotation is a direction 2301B, which is opposite to the direction of rotation defined by the cross-axis angular velocity $\Omega_Y$, and the angle of rotation equals to the angle $\theta_6$ as illustrated in FIG. 23. In some embodiments, the PS 215 determines the angle of rotation $\theta_6$ based on the determined cross-axis angular velocity $\Omega_Y$ by employing suitable kinematic equations. For example, the angle of rotation $\theta_6$ may be determined by time-integrating the determined cross-axis angular velocity $\Omega_Y$.

In some embodiments when the at least one Raman pulse is the third Raman pulse 1505 (corresponding to the Raman laser beam pair 1401C), the determined axis of rotation is the axis of rotation defined by the cross-axis angular velocity $\Omega_Y$, the determined direction of rotation is a direction 2301C, which is opposite to the direction of rotation defined by the cross-axis angular velocity $\Omega_Y$, and the angle of rotation equals to the angle $\theta_7$ as illustrated in FIG. 23. In some embodiments, the PS 215 determines the angle of rotation $\theta_7$ based on the determined cross-axis angular velocity $\Omega_Y$ by employing suitable kinematic equations. For example, the angle of rotation $\theta_7$ may be determined by time-integrating the determined cross-axis angular velocity $\Omega_Y$.

In some embodiments when the platform 103 of the hybrid INS 101 is directly mounted on the vehicle 105 (see FIG. 1A), step 2407 of the FF method 2400 includes generating, by the PS 215, a control signal $S_2$ based on the determined axis, determined direction, and determined angle of rotation; transferring, by the PS 215, the control signal $S_2$ to the Raman laser system 213 of the LPAI-GYRO 209 of the hybrid INS 101 (see FIG. 2); and rotating, by the Raman laser system 213 of the LPAI-GYRO 209, the at least one Raman pulse around the determined axis by the determined angle of rotation in the determined direction of rotation. In some embodiments, the Raman laser system 213 may use optical plates, mirrors, piezo tip-tilt stages, acousto-optic deflectors, electro-optic modulators, combinations thereof, or the like to rotate the at least one Raman pulse.

In some embodiments when the platform 103 of the hybrid INS 101 is mounted on the vehicle 105 using the gimbal mount 107 (see FIG. 1B), step 2407 of the FF method 2400 includes generating, by the PS 215, a control signal $S_2$ based on the determined axis, determined direction, and determined angle of rotation; transferring, by the PS 215, the control signal $S_2$ to the gimbal mount 107 (see FIG. 1B); and rotating, by the gimbal mount 107, the platform 103 with the Raman laser system 213 placed on the platform 103, such that the at least one Raman pulse is rotated around the determined axis by the determined angle of rotation in the determined direction of rotation, due to rotation of the gimbal mount 107. In some embodiments, a control system (not illustrated) of the gimbal mount 107 is used to rotate the platform 103 with the Raman laser system 213 placed on the platform 103.

Referring back to FIGS. 1A, 2 and 14, in some embodiments when the platform 103 of the hybrid INS 101 is directly mounted to the vehicle 105, on-axis acceleration effects on the LPAI-GYRO 1400 may be corrected by performing the FF method 1700 described above with reference to FIG. 17. In some embodiments when the platform 103 of the hybrid INS 101 is directly mounted to the vehicle 105, cross-axis acceleration effects on the LPAI-GYRO 1400 may be corrected by performing the FF methods 1900 and/or 2000 described above with reference to FIGS. 19 and 20, respectively. In some embodiments when the platform 103 of the hybrid INS 101 is directly mounted to the vehicle 105, on-axis rotation effects on the LPAI-GYRO 1400 may be corrected by performing the FF method 2200 described above with reference to FIG. 22. In some embodiments when the platform 103 of the hybrid INS 101 is directly mounted to the vehicle 105, cross-axis rotation effects on the LPAI-GYRO 1400 may be corrected by performing the FF method 2400 described above with reference to FIG. 24.

Referring back to FIGS. 1B, 2 and 14, in some embodiments when the platform 103 of the hybrid INS 101 is mounted to the vehicle 105 using the gimbal mount 107, on-axis acceleration effects on the LPAI-GYRO 1400 may be corrected by performing the FF method 1700 described above with reference to FIG. 17. In some embodiments when the platform 103 of the hybrid INS 101 is mounted to the vehicle 105 using the gimbal mount 107, cross-axis acceleration effects on the LPAI-GYRO 1400 may be corrected by performing the FF methods 1900 and/or 2000 described above with reference to FIGS. 19 and 20, respectively. In some embodiments when the platform 103 of the hybrid INS 101 is mounted to the vehicle 105 using the gimbal mount 107, on-axis rotation effects on the LPAI-GYRO 1400 may be corrected by performing the FF method 2200 described above with reference to FIG. 22. In some embodiments when the platform 103 of the hybrid INS 101 is mounted to the vehicle 105 using the gimbal mount 107, cross-axis rotation effects on the LPAI-GYRO 1400 may be corrected by performing the FF method 2400 described above with reference to FIG. 24.

Referring back to FIGS. 2 and 14, in addition to correcting for the on-axis acceleration, cross-axis acceleration, on-axis rotation, and cross-axis rotation effects, the PS 215 may also be configured to correct for the wavefront (spatial) aberration for the Raman laser beams 411 and 413. Due to the wavefront aberration, atoms in the atomic cloud 403 experience an inhomogeneous wavefront, which limits light-pulse atom interferometry operations. In some embodiments, the wavefront aberration may be caused by defects or stress in various optical elements of the LPAI-GYRO 1400 that are used to manipulate, shape, steer and rotate the Raman laser beams 411 and 413. The stress in various optical elements of the LPAI-GYRO 1400 may be caused by time-varying linear/angular velocities experienced by the LPAI-GYRO 1400. In some embodiments, the wavefront aberration may be detected with a CCD camera (not shown) and processed by the PS 215. Subsequently, the PS 215 sends a control signal to, for example, a deformable mirror (not shown) to correct for the wavefront aberration of the Raman laser beams 411 and 413.

Referring back to FIGS. 1A, 1, 2, and 14, the PS 215 and the conventional IMU 201 may also be configured to perform a vibration noise cancellation. In some embodiments, transfer functions of the vehicle 105, the platform 103, and the LPAI sensors 203 and 209 are determined through the characterization of mechanical vibration response. The conventional IMU 201 (with a pre-determined transfer function) determines the vibration noise characteristics (such as, for example, amplitude and frequency). Subsequently, the PS 215 filters the vibration noise from interferometry signals based on the transfer functions and the determined vibration noise characteristics.

Figure 25:
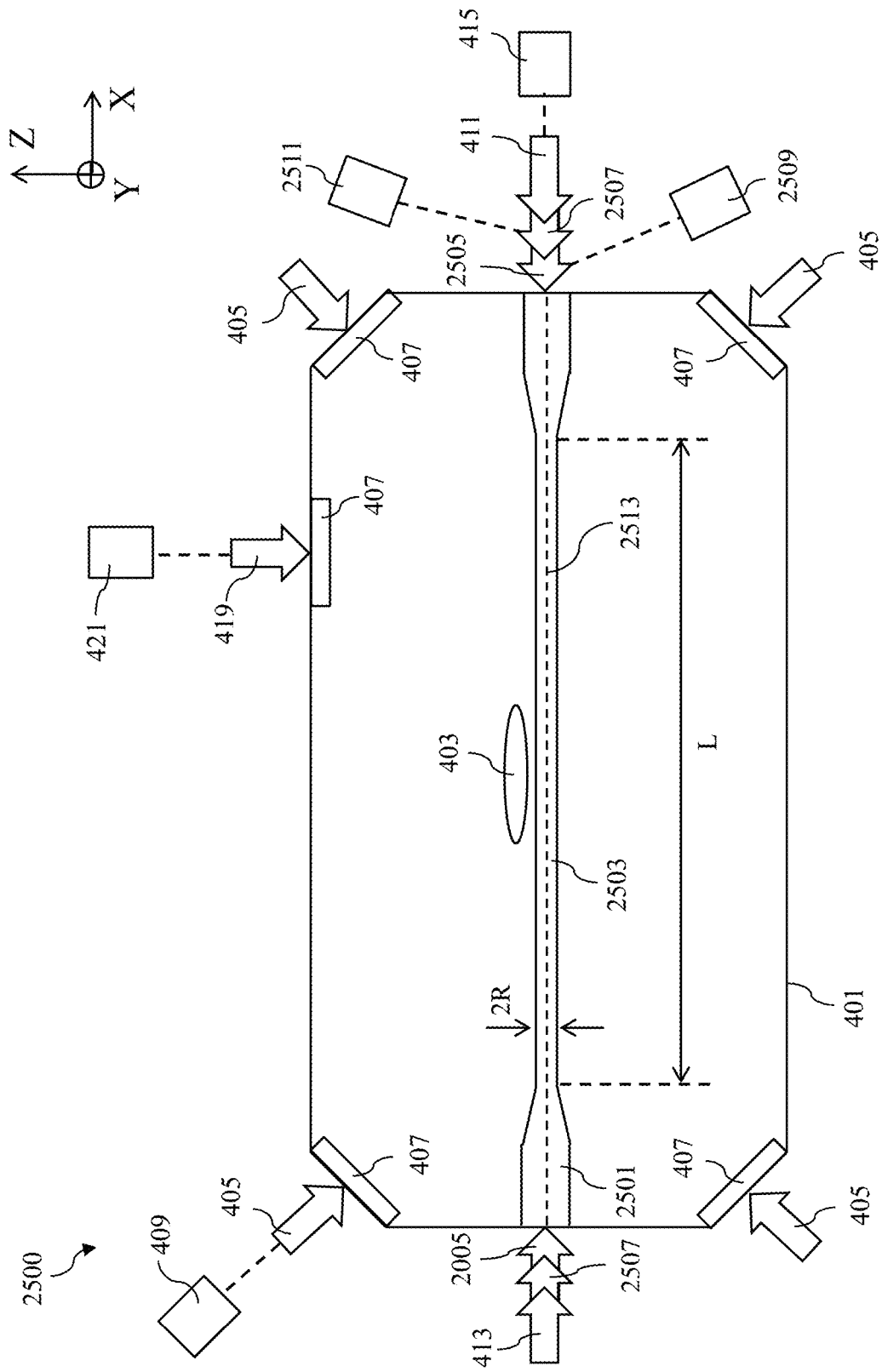
FIG. 25 illustrates an LPAI accelerometer in accordance with some embodiments.

FIG. 25 illustrates an LPAI-ACC 2500 in accordance with some embodiments. In the illustrated embodiment, the LPAI-ACC 2500 is configured to measure acceleration along X axis. In other embodiments, the LPAI-ACC 2500 may be configured to measure accelerations along Y and Z axes. Three orthogonal accelerometers (measuring accelerations along X, Y, and Z axes), such as the LPAI-ACC 2500, may be implemented as the LPAI-ACC 203 of the hybrid INS 101 illustrated in FIG. 2.

In some embodiments, the LPAI-ACC 2500 is similar to the LPAI-ACC 400 described above with reference to FIG. 4, with similar features being labeled by similar numerical references, and descriptions of the similar features are not repeated herein. In some embodiments, the LPAI-ACC 2500 comprises an optical fiber 2501 extending thorough a vacuum chamber 401 of the LPAI-ACC 2500. In some embodiments, the optical fiber 2501 comprises a nanofiber portion 2503, which is placed within the vacuum chamber 401 such that the nanofiber portion 2503 overlaps with a MOT generated by laser beams 405 and anti-Helmholtz magnetic coils (not illustrated). In some embodiments, the Raman laser beams 411 and 413 are coupled to the optical fiber 2501 and propagate through the nanofiber portion 2503. In some embodiments, an atomic cloud 403 is trapped at a surface of the nanofiber portion 2503.

In some embodiments, the nanofiber portion 2503 of the optical fiber 2501 may be formed by stretching the optical fiber 2501 while heating a desired portion of the optical fiber 2501. In some embodiments, the optical fiber 2501 is stretched using two independent pulling stages (not shown). In some embodiments, the desired portion of the optical fiber 2501 is heated with a torch (for example, an oxyhydrogen torch) that "brushes" or sweeps across the desired portion of the optical fiber 2501 while simultaneously stretching the optical fiber 2501. In other embodiments, the torch is kept stationary and the pulling stages oscillate to simulate the torch sweep while simultaneously stretching the optical fiber 2501. In some embodiments, motors of the pulling stages are controlled using a suitable algorithm to obtain a desired taper geometry, desired radius R, and desired length L of the nanofiber portion 2503. The taper of the nanofiber portion 2503 may be linear, exponential, or may have other desired shapes.

The LPAI-ACC 2500 further comprises a pair of counter-propagating laser beams 2505 and a pair of counter-propagating laser beams 2507, which are coupled to the optical fiber 2501. In some embodiments, the laser beams 2505 are generated by a single laser apparatus 2509. In some embodiments, optical components are used to form the laser beams 2505 from a single laser beam generated by the laser apparatus 2509. In some embodiments, the laser beams 2507 are generated by a single laser apparatus 2511. In some embodiments, optical components are used to form the laser beams 2507 from a single laser beam generated by the laser apparatus 2511. The optical components may comprise waveplates, beam splitters, mirrors, the like, or combinations thereof. In other embodiments, the laser beams 2505 and the laser beams 2507 are generated by a same laser apparatus.

In some embodiments, the laser beams 2505 and 2507 form a dipole trap at the surface of the nanofiber portion 2503, which traps atoms in the atomic cloud 403 at the surface of the nanofiber portion 2503. In some embodiments, the dipole trap overlaps with the MOT. In some embodiments, the laser beams 2505 and 2507 generate a dipole potential such that the atoms in the atomic cloud 403 are free to move along an axis that is parallel to a long axis 2513 of the nanofiber portion 2503 of the optical fiber 2501 and are confined in a radial direction. In the illustrated embodiment, the long axis 2513 of the nanofiber portion 2503 is parallel to the X axis. The long axis 2513 of the nanofiber portion 2503 may be also referred to as a sensing axis. In some embodiments, the atoms of the atomic cloud 403 may be also confined in an azimuthal direction. In some embodiment when the atoms are confined both in radial and azimuthal directions, the dipole trap acts as a waveguide for the atoms, such that the atoms in the atomic cloud 403 effectively form a one-dimensional system. In such embodiments, the sensing axis 2515 is a guiding axis for the atoms. Accordingly, the LPAI-ACC 2500 may be also referred to as a guided LPAI-ACC.

In some embodiments, the dipole trap is generated by radially decaying evanescent (for example, exponentially decaying) fields from the laser beams 2505 and 2507 propagating through the nanofiber portion 2503. In some embodiments, the laser beams 2505 are red-detuned off-resonant laser beams and the laser beams 2507 are blue-detuned off-resonant laser beams. The red-detuned laser beams generate an attractive potential for the atoms and the blue-detuned laser beams generate a repulsive potential for the atoms. Using the off-resonant laser beams reduces spontaneous emission and increases a trap lifetime for the dipole trap.

In some embodiments, the radius R of the nanofiber portion 2503 is chosen to maximize the interaction between the atoms in the atomic cloud 403 and the evanescent fields from the laser beams 2505 or 2507. In some embodiments, the interaction between atoms and the evanescent field is maximized for a ratio R/λ equal to about 0.23, where λ is a wavelength of the laser beam generating the evanescent field. In some embodiments when the atomic cloud 403 comprises $^{133}$Cs atoms, a wavelength $\lambda_{red}$ of the red-detuned laser beams 2505 is chosen to be about 937 nm, a wavelength $\lambda_{blue}$ of the blue-detuned laser beams 2507 is chosen to be about 685 nm (or about 793 nm), and a wavelength $\lambda_{Raman}$ of the Raman beams 411 and 413 is chosen to be about 852 nm. In some embodiments, the radius R of the nanofiber portion 2503 is chosen to maximize the interaction between atoms in the atomic cloud 403 and the red-detuned laser beams 2505 by setting the radius R to be about 215 nm, such that the ratio $R/\lambda_{red}$ is about 0.23.

In some embodiments, polarizations of the red-detuned laser beams 2505 and the blue-detuned laser beams 2507 are varied to vary confinement of the dipole trap potential. In some embodiments when a radial confinement is desired, circularly polarized red-detuned laser beams 2505 and circularly polarized blue-detuned laser beams 2507 are used. In some embodiments when radial and azimuthal confinements are desired, linearly polarized red-detuned laser beams 2505 and linearly polarized blue-detuned laser beams 2507 are used. In some embodiments, the red-detuned laser beams 2505 and the blue-detuned laser beams 2507 may have parallel linear polarizations. In other embodiments, the red-detuned laser beams 2505 and the blue-detuned laser beams 2507 may have non-parallel (for example, cross) linear polarizations.

Referring further to FIG. 25, after trapping and cooling the atomic cloud 403 in the MOT, the atomic cloud 403 is transferred to the dipole trap generated at the surface of the nanofiber portion 2503. Subsequently, the MOT is turned off while maintaining the dipole trap generated at the surface of the nanofiber portion 2503. The atomic cloud 403 is then subject to inertial forces such as accelerations and rotations in all three dimensions. After turning off the MOT, a sequence of Raman pulses from the Raman laser beams 411 and 413 is applied to the atomic cloud 403 as a part of light-pulse atom interferometry operations. In some embodiments, the sequence of Raman pulses comprises the Raman pulses 601, 603, and 605, which are applied to the atomic cloud 403 as described above with reference to FIG. 6, and the description is not repeated herein.

Due to the confinement of the atomic cloud 403 in the dipole trap in the direction perpendicular to the sensing axis 2513, relative motion of atoms in the atomic cloud 403 due to cross-axis accelerations and rotations (such as accelerations and rotations perpendicular to the sensing axis 2513) is reduced. However, since the atomic cloud 403 is coupled to evanescent (for example, exponentially decaying) fields generated by the Raman laser beams 411 and 413 propagating through the nanofiber portion 2503, even reduced relative motion of the atoms in the direction perpendicular to the sensing axis 2513 may affect the performance of the LPAI-ACC 2500. In some embodiments, effects due to on-axis acceleration (see FIG. 7), cross-axis acceleration (see FIG. 9), and cross-axis rotation (see FIG. 12) may be corrected using suitable FF methods.

In some embodiments, on-axis acceleration effects may be corrected using the FF method 800 described above with reference to FIG. 8, and the description is not repeated herein. In some embodiments, cross-axis acceleration effects may be corrected by performing the FF methods 1000 and/or 1100 described above with reference to FIGS. 10 and 11, respectively, and the description is not repeated herein. In some embodiments, cross-axis rotation effects may be corrected by performing the FF method 1300 described above with reference to FIG. 13, and the description is not repeated herein.

Figure 26:
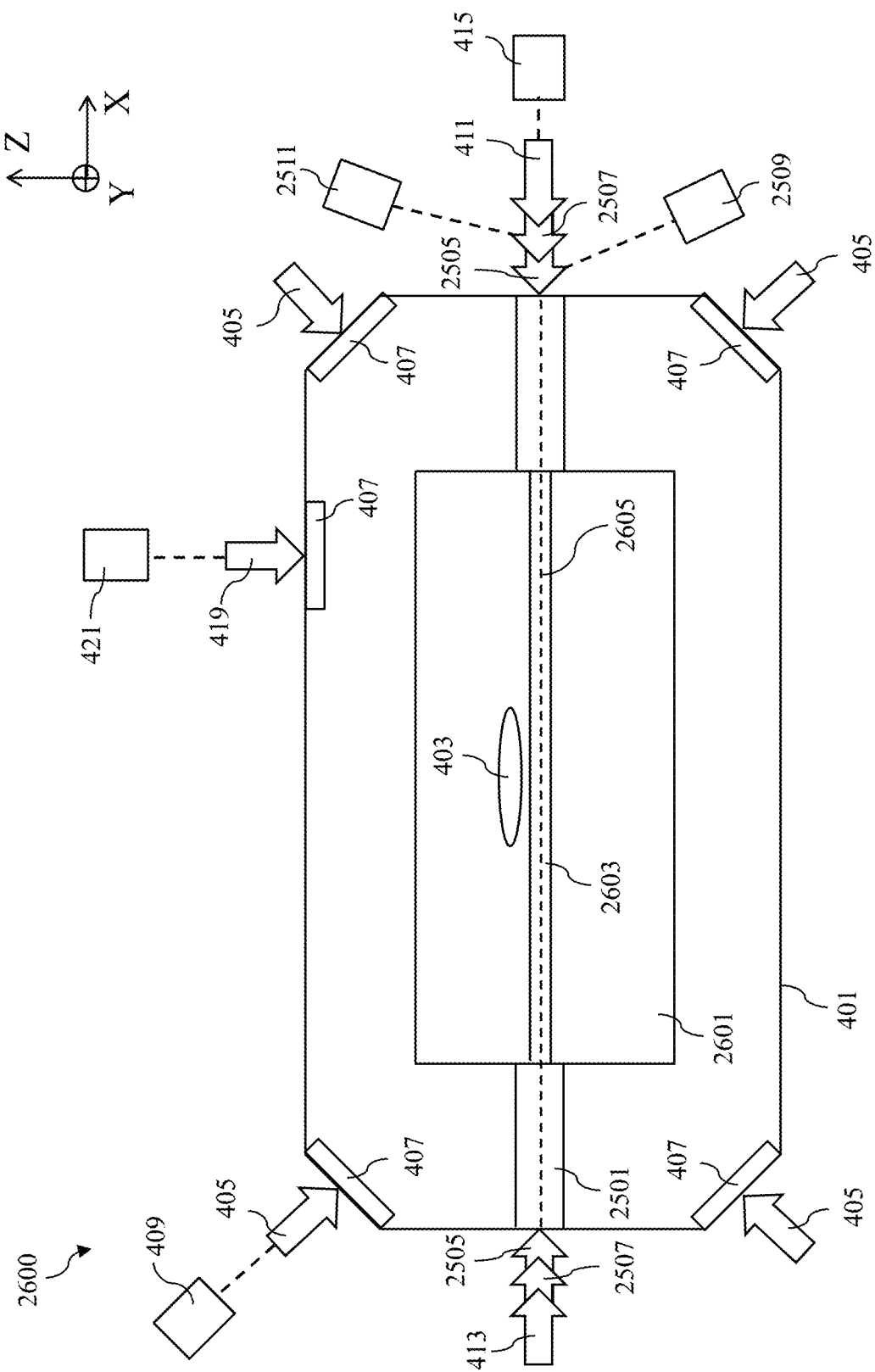
FIG. 26 illustrates an LPAI accelerometer in accordance with some embodiments.

FIG. 26 illustrates an LPAI-ACC 2600 in accordance with some embodiments. In the illustrated embodiment, the LPAI-ACC 2600 is configured to measure acceleration along X axis. In other embodiments, the LPAI-ACC 2600 may be configured to measure accelerations along Y and Z axes. Three orthogonal accelerometers (measuring accelerations along X, Y, and Z axes), such as the LPAI-ACC 2600, may be implemented as the LPAI-ACC 203 of the hybrid INS 101 illustrated in FIG. 2.

In some embodiments, the LPAI-ACC 2600 is similar to the LPAI-ACC 2500 described above with reference to FIG. 25, with similar features being labeled by similar numerical references, and descriptions of the similar features are not repeated herein. In some embodiments, the LPAI-ACC 2600 comprises an optical waveguide 2603 placed in a vacuum chamber 401 of the LPAI-ACC 2600 and is coupled to an optical fiber 2501. In some embodiment, the optical waveguide 2603 is a linear waveguide formed over a semiconductor chip 2601. In some embodiments, an atomic cloud 403 is trapped at a surface of the optical waveguide 2603.

In some embodiments, the laser beams 2505 and 2507 form a dipole trap at the surface of the optical waveguide 2603 as described above with reference to FIG. 25, and the description is not repeated herein. In some embodiments, the laser beams 2505 and 2507 generate the dipole potential such that the atoms in the atomic cloud 403 are free to move along an axis that is parallel to a long axis 2605 of the optical waveguide 2603 and are confined both in radial and azimuthal directions. In the illustrated embodiment, the long axis 2605 of the optical waveguide 2603 is parallel to the X axis. The long axis 2605 of the optical waveguide 2603 may be also referred to as a sensing axis. In some embodiment when the atoms are confined both in radial and azimuthal directions, the atoms in the atomic cloud 403 effectively form a one-dimensional system. In such embodiments, the sensing axis 2605 is a guiding axis for the atoms. Accordingly, the LPAI-ACC 2600 may be also referred to as a guided LPAI-ACC.

Referring further to FIG. 26, after trapping and cooling the atomic cloud 403 in the MOT, the atomic cloud 403 is transferred to the dipole trap generated at the surface of the optical waveguide 2603. Subsequently, the MOT is turned off while maintaining the dipole trap generated at the surface of the optical waveguide 2603. The atomic cloud 403 is then subject to inertial forces such as accelerations and rotations in all three dimensions. After turning off the MOT, a sequence of Raman pulses from the Raman laser beams 411 and 413 is applied to the atomic cloud 403 as a part of light-pulse atom interferometry operations. In some embodiments, the sequence of Raman pulses comprises the Raman pulses 601, 603, and 605, which are applied to the atomic cloud 403 as described above with reference to FIG. 6, and the description is not repeated herein.

Due to the confinement of the atomic cloud 403 in the dipole trap in the direction perpendicular to the sensing axis 2605, relative motion of atoms in the atomic cloud 403 due to cross-axis accelerations and rotations (such as accelerations and rotations perpendicular to the sensing axis 2605) is reduced. However, since the atomic cloud 403 is coupled to evanescent (for example, exponentially decaying) fields generated by the Raman laser beams 411 and 413 propagating thought the optical waveguide 2603, even reduced relative motion of the atoms in the direction perpendicular to the sensing axis 2605 may affect the performance of the LPAI-ACC 2600. In some embodiments, effects due to on-axis acceleration (see FIG. 7), cross-axis acceleration (see FIG. 9), and cross-axis rotation (see FIG. 12) may be corrected using suitable FF methods.

In some embodiments, on-axis acceleration effects may be corrected by performing the FF method 800 described above with reference to FIG. 8, and the description is not repeated herein. In some embodiments, cross-axis acceleration effects may be corrected by performing the FF methods 1000 and/or 1100 described above with reference to FIGS. 10 and 11, respectively, and the description is not repeated herein. In some embodiments, cross-axis rotation effects may be corrected by performing the FF method 1300 described above with reference to FIG. 13, and the description is not repeated herein.

Figure 27:
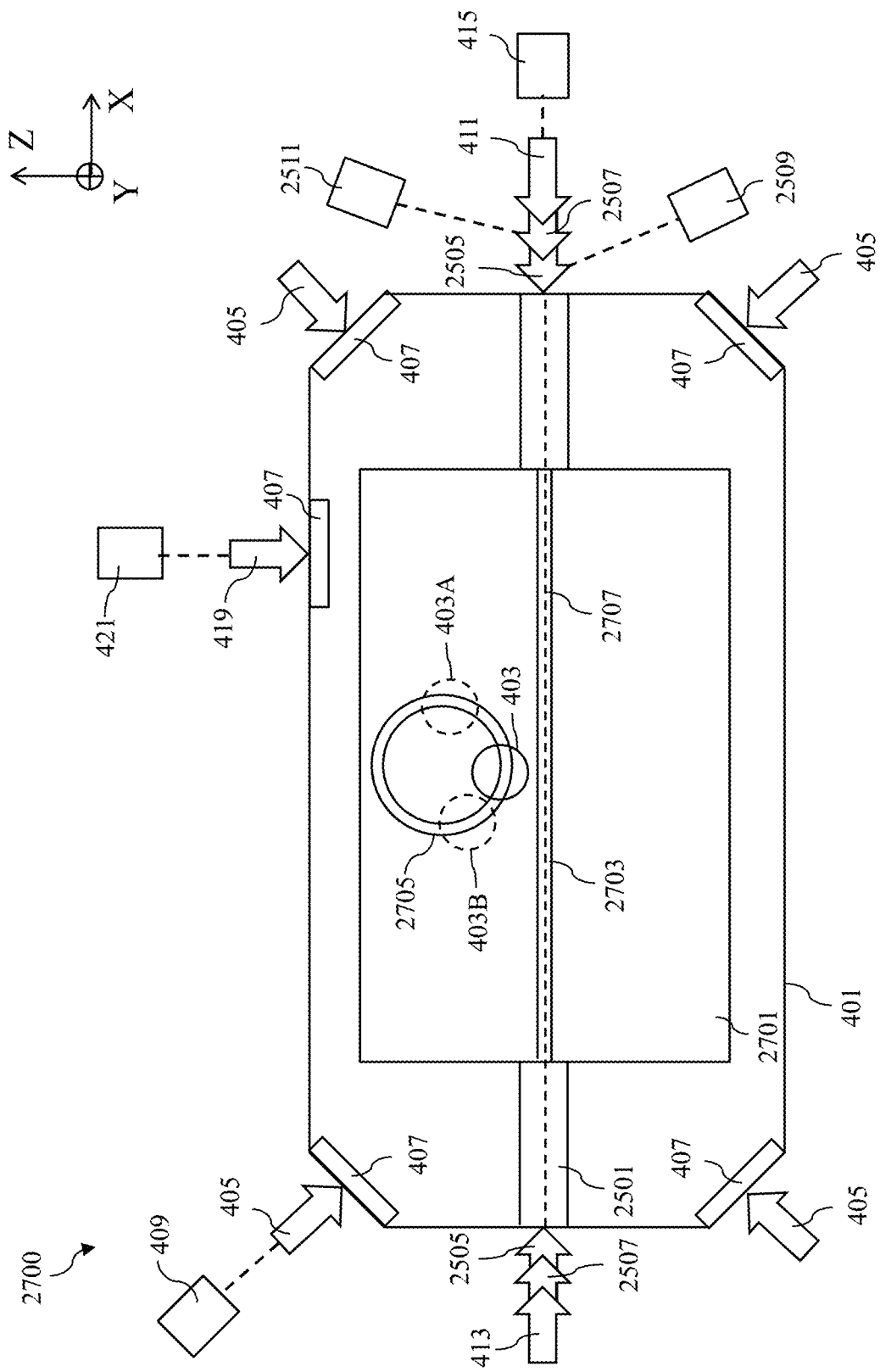
FIG. 27 illustrates an LPAI gyroscope in accordance with some embodiments.

FIG. 27 illustrates an LPAI-GYRO 2700 in accordance with some embodiments. In the illustrated embodiment, the LPAI-GYRO 2700 is configured to measure angular velocity along Y axis. In other embodiments, the LPAI-GYRO 2700 may be configured to measure angular velocities along X and Z axes. Three orthogonal gyroscopes (measuring angular velocities along X, Y, and Z axes), such as the LPAI-GYRO 2700, may be implemented as the LPAI-GYRO 209 of the hybrid INS 101 illustrated in FIG. 2.

In some embodiments, structure of the LPAI-GYRO 2700 is similar to the structure of the LPAI-ACC 2600 described above with reference to FIG. 26, with similar features being labeled by similar numerical references, and descriptions of the similar features are not repeated herein. In some embodiments, the LPAI-GYRO 2700 comprises a linear waveguide 2703 and a ring-shaped waveguide 2705 placed in a vacuum chamber 401. In some embodiment, the linear waveguide 2703 and the ring-shaped waveguide 2705 are formed over a semiconductor chip 2701. In some embodiments, the linear waveguide 2703 and the ring-shaped waveguide 2705 are coupled to an optical fiber 2501. The long axis 2707 of the linear waveguide 2703 may be also referred to as a sensing axis.

In some embodiments, the laser beams 2505 and 2507 propagate through the optical fiber, the linear waveguide 2703, and the ring-shaped waveguide 2705, and form a ring-shaped dipole trap at a surface of the ring-shaped waveguide 2705. In some embodiments, the dipole trap is generated as described above with reference to FIG. 25, and the description is not repeated herein. In some embodiments, the ring-shaped dipole trap restricts the motion of atoms in the atomic cloud 403, such that the atoms are free to move along a circle defined by the ring-shaped dipole trap and are confined in transverse directions. Accordingly, the LPAI-GYRO 2700 may be also referred to as a guided LPAI-GYRO.

Referring further to FIG. 27, after trapping and cooling the atomic cloud 403 in the MOT, the atomic cloud 403 is transferred to the ring-shaped dipole trap generated at the surface of the ring-shaped waveguide 2705. The atomic cloud 403 is then subject to inertial forces such as accelerations and rotations in all three dimensions. After turning off the MOT, a sequence of Raman pulses from the Raman laser beams 411 and 413 is applied to the atomic cloud 403 as a part of light-pulse atom interferometry operations. In some embodiments, the atomic cloud 403 (illustrated by solid circle) is split into atomic clouds 403A and 403B (illustrated by dashed circles), which propagate along the ring-shaped dipole trap in opposite directions. In some embodiments, the sequence of Raman pulses comprises the Raman pulses 601, 603, and 605, which are applied to the atomic cloud 403 as described above with reference to FIG. 6, and the description is not repeated herein.

Due to the confinement of the atomic cloud 403 in the ring-shaped dipole trap in the transverse direction, relative motion of atoms in the atomic cloud 403 due to cross-axis accelerations and rotations (such as accelerations and rotations perpendicular to the sensing axis 2707) is reduced. However, since the atomic cloud 403 is coupled to evanescent (for example, exponentially decaying) fields generated by the Raman laser beams 411 and 413 propagating thought the linear waveguide 2703 and the ring-shaped waveguide 2705, even reduced relative motion of the atoms in the transverse direction may affect the sensitivity of the LPAI-GYRO 2700. In some embodiments, effects due to on-axis acceleration, cross-axis acceleration, on-axis rotation, and cross-axis rotation may be corrected using suitable FF methods.

In some embodiments, on-axis acceleration effects may be corrected by performing the FF method 1700 described above with reference to FIG. 17, and the description is not repeated herein. In some embodiments, cross-axis acceleration effects may be corrected by performing the FF methods 1900 and/or 2000 described above with reference to FIGS. 19 and 20, respectively, and the description is not repeated herein. In some embodiments, on-axis rotation effects may be corrected by performing the FF method 2200 described above with reference to FIG. 22, and the description is not repeated herein. In some embodiments, cross-axis rotation effects may be corrected by performing the FF method 2400 described above with reference to FIG. 24, and the description is not repeated herein.

Figure 28:
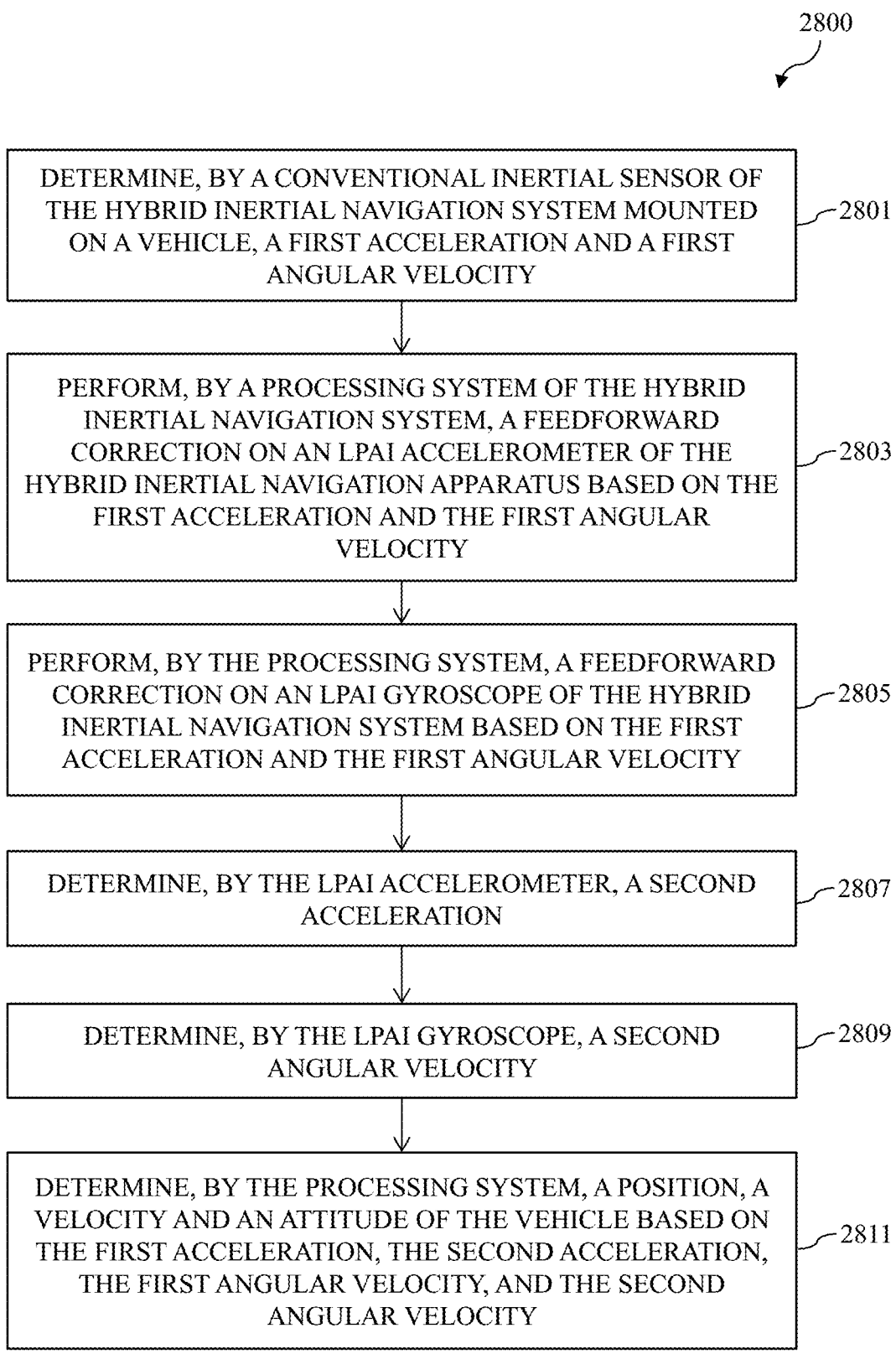
FIG. 28 is a flow diagram illustrating a method of hybrid inertial navigation in accordance with some embodiments.

FIG. 28 is a flow diagram illustrating a method 2800 of hybrid inertial navigation in accordance with some embodiments. Referring to FIGS. 1A, 1, 2, and 28, the method 2800 starts with step 2801, when the conventional IMU 201 of the hybrid INS 101 that is mounted on the vehicle 105 determines a first acceleration $a_1$ and a first angular velocity $\Omega_1$. In step 2803, the PS 215 of the hybrid INS 101 performs a FF correction on the LPAI-ACC 203 of the hybrid INS 101 based on the determined first acceleration $a_1$ and the determined first angular velocity $\Omega_1$. In some embodiments, step 2803 comprises performing the FF methods 800, 1000, 1100, and/or 1300 as described above with reference to FIGS. 8, 10, 11, and 13, respectively. In step 2805, the PS 215 performs an FF correction on the LPAI-GYRO 209 of the hybrid INS 101 based on the determined first acceleration $a_1$ and the determined first angular velocity $\Omega_1$. In some embodiments, step 2805 comprises performing the FF methods 1700, 1900, 2000, 2200, and/or 2400 as described above with reference to FIGS. 17, 19, 20, 22, and 24, respectively. In step 2807, the LPAI-ACC 203 determines a second acceleration $a_2$. In step 2809, the LPAI-GYRO 209 determines a second angular velocity $\Omega_2$. In step 2811, the PS 215 determines, a position (x), a velocity (v), and an attitude (θ) of the vehicle based on the determined first acceleration $a_1$, the determined second acceleration $a_2$, the determined first angular velocity $\Omega_1$, and the determined second angular velocity $\Omega_2$. In some embodiments, the PS 215 executes a suitable inertial navigation algorithm. The suitable inertial navigation algorithm may comprise Kalman filtering algorithms, machine learning algorithms, neural network algorithms, combinations thereof, or the like.

As described above in greater detail, two-photon Raman transitions are used for light-pulse atom interferometry. In other embodiments, light-pulse atom interferometry may be performed using Bragg pulses or state-dependent momentum kicks. Various FF correction methods presented above may be also applied to Bragg pulses or state-dependent momentum kicks.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A hybrid inertial navigation system (INS) comprising:
a conventional inertial measurement unit (EIU) including a three-axis accelerometer and a three-axis gyroscope;
a light-pulse atom interferometer accelerometer (LPAI-ACC), a sensing axis of the LPAI-ACC being parallel to an axis of Doppler-sensitive Raman pulses in the LPAI-ACC, a Raman light pulse sequence of the LPAI-ACC corresponding to $\pi/2 \to T \to \to T \to \pi/2$, wherein $\pi/2$ and $\pi$ are Raman pulses, and wherein T is an interrogation time between two Raman pulses; and
a processing system (PS) coupled to the conventional IMU, and the LPAI-ACC, wherein the PS and the conventional IMU are configured to perform LPAI-ACC feedforward correction operations (FF-COs) on the LPAI-ACC;
wherein the LPAI-ACC FF-COs include:
determining, by the conventional IMU, at least one of a first acceleration along a first direction parallel to the sensing axis of the LPAI-ACC, a second acceleration along a second direction perpendicular to the sensing axis of the LPAI-ACC, or an angular velocity along a third direction perpendicular to the sensing axis of the LPAI-ACC;
determining, by the PS, at least one of a corrected pulse duration, a shift direction, a shift distance, a rotation axis, a rotation direction, or a rotation angle for at least one Raman pulse of the LPAI-ACC based on the at least one of the first acceleration, the second acceleration, or the angular velocity;
generating, by the PS, at least one control signal based on the at least one of the corrected pulse duration, the shift direction, the shift distance, the rotation axis, the rotation direction, or the rotation angle; and
enacting the at least one control signal.

2. The hybrid INS of claim 1, wherein the LPAI-ACC FF-COs include:
determining, by the conventional IMU, the first acceleration along the first direction;
determining, by the PS, the corrected pulse duration for at least one Raman pulse of the LPAI-ACC based on the first acceleration; and
generating, by the PS, a first control signal based on the corrected pulse duration;
wherein enacting the first control signal includes setting, by an LPAI-ACC Raman laser system, a pulse duration of the at least one LPAI-ACC Raman pulse to the corrected pulse duration, based on the first control signal.

3. The hybrid INS of claim 1, wherein the LPAI-ACC FF-COs include:
determining, by the conventional IMU, the second acceleration along the second direction;
determining, by the PS, the shift direction and the shift distance for at least one Raman pulse of the LPAI-ACC based on the second acceleration; and
generating, by the PS, a third control signal based on the shift direction and the shift distance;
wherein enacting the third control signal includes translating the at least one LPAI-ACC Raman pulse in the shift direction by the shift distance based on the third control signal.

4. The hybrid INS of claim 3,
wherein the shift direction is opposite to the second direction; and
wherein the shift distance is determined by the PS using kinematic equations.

5. The hybrid INS of claim 1, wherein the LPAI-ACC FF-COs include:
determining, by the conventional IMU, the angular velocity along the third direction;
determining, by the PS, the rotation axis, the rotation direction, and the rotation angle for at least one Raman pulse of the LPAI-ACC based on the angular velocity; and
generating, by the PS, a fourth control signal based on the rotation axis, the rotation direction, and the rotation angle;
wherein enacting the fourth control signal includes rotating the at least one LPAI-ACC Raman pulse around the rotation axis by the rotation angle in the rotation direction based on the fourth control signal.

6. The hybrid INS of claim 5,
wherein the rotation direction is opposite to a rotation direction defined by the angular velocity; and
wherein the rotation angle is determined by the PS using kinematic equations.

7. The hybrid INS of claim 1, wherein the LPAI-ACC includes one of a single-axis LPAI-ACC or a three-axis LPAI-ACC.

8. A hybrid inertial navigation system (INS) comprising:
a conventional inertial measurement unit (EIU) including a three-axis accelerometer and a three-axis gyroscope;
a light-pulse atom interferometer gyroscope (LPAI-GYRO), a sensing axis of the LPAI-GYRO being parallel to an axis of Doppler-sensitive Raman pulses in the LPAI-GYRO, a Raman light pulse sequence of the LPAI-GYRO corresponding to $\pi/2 \to T \to \to T \to \pi/2$, wherein $\pi/2$ and $\pi$ are Raman pulses, and wherein T is an interrogation time between two Raman pulses; and
a processing system (PS) coupled to the conventional IMU, and the LPAI-GYRO, wherein the PS and the conventional IMU are configured to perform LPAI-GYRO feedforward correction operations (FF-COs) on the LPAI-GYRO;
wherein the LPAI-GYRO FF-COs comprise:
determining, by the conventional IMU, at least one of a first acceleration along a first direction parallel to the sensing axis of the LPAI-GYRO, a second acceleration along a second direction perpendicular to the sensing axis of the LPAI-GYRO, a first angular velocity along a third direction parallel to the sensing axis of the LPAI-GYRO, or a second angular velocity along a fourth direction perpendicular to the sensing axis of the LPAI-GYRO;
determining, by the PS, at least one of a corrected pulse duration, a shift direction, a shift distance, a rotation axis, a rotation direction, or a rotation angle for at least one Raman pulse of the LPAI-GYRO based on the at least one of the first acceleration, the second acceleration, the first angular velocity, or the second angular velocity;
generating, by the PS, at least one control signal based on the at least one of the corrected pulse duration, the shift direction, the shift distance, the rotation axis, the rotation direction, or the rotation angle; and
enacting the at least one control signal.

9. The hybrid INS of claim 8, wherein the LPAI-GYRO FF-COs include:
determining, by the conventional IMU, the first acceleration along the first direction;
determining, by the PS, the corrected pulse duration for at least one Raman pulse of the LPAI-GYRO based on the first acceleration; and
generating, by the PS, a first control signal based on the corrected pulse duration;
wherein enacting the first control signal includes setting, by an LPAI-GYRO Raman laser system, a pulse duration of the at least one LPAI-GYRO Raman pulse to the corrected pulse duration, based on the first control signal.

10. The hybrid INS of claim 8, wherein the LPAI-GYRO FF-COs include:
determining, by the conventional IMU, the second acceleration along the second direction;
determining, by the PS, the shift direction and the shift distance for at least one Raman pulse of the LPAI-GYRO based on the second acceleration; and
generating, by the PS, a third control signal based on the shift direction and the shift distance;
wherein enacting the third control signal includes translating the at least one LPAI-GYRO Raman pulse in the shift direction by the shift distance based on the third control signal.

11. The hybrid INS of claim 10,
wherein the shift direction is opposite to the second direction; and
wherein the shift distance is determined by the PS using kinematic equations.

12. The hybrid INS of claim 8, wherein the LPAI-GYRO FF-COs include:
determining, by the conventional IMU, the first angular velocity along the third direction;
determining, by the PS, the rotation axis, the rotation direction, and the rotation angle for at least one Raman pulse of the LPAI-GYRO based on the first angular velocity; and
generating, by the PS, a fourth control signal based on the rotation axis, the rotation direction, and the rotation angle;
wherein enacting the fourth control signal includes rotating the at least one LPAI-GYRO Raman pulse around the rotation axis by the rotation angle in the rotation direction based on the fourth control signal.

13. The hybrid INS of claim 12,
wherein the rotation direction is opposite to a rotation direction defined by the first angular velocity; and
wherein the rotation angle is determined by the PS using kinematic equations.

14. The hybrid INS of claim 8, wherein the LPAI-GYRO FF-COs include:
determining, by the conventional IMU, the second angular velocity along the fourth direction;
determining, by the PS, the rotation axis, the rotation direction, and the rotation angle for at least one Raman pulse of the LPAI-GYRO based on the second angular velocity; and
generating, by the PS, a fifth control signal based on the rotation axis, the rotation direction, and the rotation angle;
wherein enacting the fifth control signal includes rotating the at least one LPAI-GYRO Raman pulse around the rotation axis by the rotation angle in the rotation direction based on the fifth control signal.

15. The hybrid INS of claim 14,
wherein the rotation direction is opposite to a rotation direction defined by the second angular velocity; and
wherein the rotation angle is determined by the PS using kinematic equations.

16. The hybrid INS of claim 8, wherein the LPAI-GYRO includes one of a single-axis LPAI-GYRO or a three-axis LPAI-GYRO.

17. A hybrid inertial navigation system (INS) comprising:
a conventional inertial measurement unit (EIU) including a three-axis accelerometer and a three-axis gyroscope;
a light-pulse atom interferometer accelerometer (LPAI-ACC), a sensing axis of the LPAI-ACC being parallel to an axis of Doppler-sensitive Raman pulses in the LPAI-ACC;
a light-pulse atom interferometer gyroscope (LPAI-GYRO), a sensing axis of the LPAI-GYRO being parallel to an axis of Doppler-sensitive Raman pulses in the LPAI-GYRO; and
a processing system (PS) coupled to the conventional IMU, the LPAI-ACC, and the LPAI-GYRO, wherein the PS and the conventional IMU are configured to perform at least one of LPAI-ACC feedforward correction operations (FF-COs) on the LPAI-ACC or LPAI-GYRO FF-COs on the LPAI-GYRO;
wherein the LPAI-ACC FF-COs include:
determining, by the conventional IMU, at least one of a first acceleration along a first direction parallel to the sensing axis of the LPAI-ACC, a second acceleration along a second direction perpendicular to the sensing axis of the LPAI-ACC, or an angular velocity along a third direction perpendicular to the sensing axis of the LPAI-ACC;
determining, by the PS, at least one of a corrected pulse duration, a shift direction, a shift distance, a rotation axis, a rotation direction, or a rotation angle for at least one Raman pulse of the LPAI-ACC based on the at least one of the first acceleration, the second acceleration, or the angular velocity;
generating, by the PS, at least a first control signal based on the at least one of the corrected pulse duration, the shift direction, the shift distance, the rotation axis, the rotation direction, or the rotation angle; and
enacting the at least a first control signal; and
wherein the LPAI-GYRO FF-COs comprise:
determining, by the conventional IMU, at least one of a first acceleration along a first direction parallel to the sensing axis of the LPAI-ACC, a second acceleration along a second direction perpendicular to the sensing axis of the LPAI-ACC, a first angular velocity along a third direction parallel to the sensing axis of the LPAI-ACC, or a second angular velocity along a fourth direction perpendicular to the sensing axis of the LPAI-ACC;
determining, by the PS, at least one of a corrected pulse duration, a shift direction, a shift distance, a rotation axis, a rotation direction, or a rotation angle for at least one Raman pulse of the LPAI-GYRO based on the at least one of the first acceleration, the second acceleration, the first angular velocity, or the second angular velocity;
generating, by the PS, at least a second control signal based on the at least one of the corrected pulse duration, the shift direction, the shift distance, the rotation axis, the rotation direction, or the rotation angle; and
enacting the at least a second control signal.

18. The hybrid INS of claim 17,
wherein the LPAI-ACC includes one of a single-axis LPAI-ACC or a three-axis LPAI-ACC; and
wherein the LPAI-GYRO includes one of a single-axis LPAI-GYRO or a three-axis LPAI-GYRO.

* * * * *